(12) United States Patent
Barros et al.

(10) Patent No.: US 12,625,980 B2
(45) Date of Patent: May 12, 2026

(54) MAPPING A TANGIBLE INSTANCE OF A DOCUMENT

(71) Applicant: Google LLC, Mountain View, CA (US)

(72) Inventors: Brett Barros, San Mateo, CA (US); Alexander James Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 328 days.

(21) Appl. No.: 18/248,983

(22) PCT Filed: Oct. 19, 2020

(86) PCT No.: PCT/US2020/070674
§ 371 (c)(1),
(2) Date: Apr. 13, 2023

(87) PCT Pub. No.: WO2022/086578
PCT Pub. Date: Apr. 28, 2022

(65) Prior Publication Data
US 2023/0385431 A1      Nov. 30, 2023

(51) Int. Cl.
G06F 21/60 (2013.01)
(52) U.S. Cl.
CPC .................................. G06F 21/604 (2013.01)
(58) Field of Classification Search
CPC .................................................... G06F 21/604
See application file for complete search history.

(56) References Cited

U.S. PATENT DOCUMENTS

| | | | | |
|---|---|---|---|---|
| 6,453,416 B1* | 9/2002 | Epstein | ................... | G06F 21/64 |
| | | | | 713/170 |
| 9,471,581 B1 | 10/2016 | Lee | | |
| 10,599,753 B1 | 3/2020 | Eisner et al. | | |
| 2003/0095681 A1* | 5/2003 | Burg | ................. | H04N 1/00323 |
| | | | | 707/E17.11 |
| 2006/0041605 A1* | 2/2006 | King | ...................... | G06F 16/93 |

(Continued)

FOREIGN PATENT DOCUMENTS

| | | |
|---|---|---|
| JP | 2009211603 A | 9/2009 |
| JP | 2012248940 A | 12/2012 |

(Continued)

OTHER PUBLICATIONS

Office Action for Korean Application No. 10-2023-7016612 (with English translation), mailed Feb. 7, 2025, 20 pages.

(Continued)

*Primary Examiner* — Vance M Little
(74) *Attorney, Agent, or Firm* — Brake Hughes Bellermann LLP

(57) ABSTRACT

A computer-implemented method comprises: detecting, by a first computer system, first content of a tangible instance of a first document; generating, by the first computer system, a first hash using the first content, the first hash including first obfuscation content; sending, by the first computer system, the first hash for receipt by a second computer system; and receiving, by the first computer system, a response to the first hash generated by the second computer system, the response including information corresponding to a second document associated with the first content.

36 Claims, 15 Drawing Sheets

(56)                    References Cited

U.S. PATENT DOCUMENTS

| | | | |
|---|---|---|---|
| 2007/0124590 A1* | 5/2007 | Vanstone | ................ H04L 9/002 |
| | | | 713/169 |
| 2013/0100501 A1 | 4/2013 | Chen et al. | |
| 2014/0289644 A1 | 9/2014 | Clarke et al. | |
| 2015/0220506 A1* | 8/2015 | Parkinson | ........... G06F 16/9558 |
| | | | 715/231 |
| 2015/0371445 A1 | 12/2015 | Karrer Walker et al. | |
| 2016/0162734 A1 | 6/2016 | Ross et al. | |
| 2016/0285838 A1 | 9/2016 | Ford et al. | |
| 2017/0093870 A1 | 3/2017 | Meyer | |
| 2018/0276896 A1 | 9/2018 | Launonen | |
| 2019/0019022 A1* | 1/2019 | Marda | ..................... G06F 16/93 |
| 2019/0087792 A1 | 3/2019 | Chow et al. | |
| 2021/0098092 A1 | 4/2021 | Katuwal et al. | |

FOREIGN PATENT DOCUMENTS

| | | |
|---|---|---|
| JP | 2014093036 A | 5/2014 |
| KR | 101351449 B1 | 1/2014 |
| KR | 20190072554 A | 6/2019 |

OTHER PUBLICATIONS

International Search Report and Written Opinion for PCT Application No. PCT/US2020/070674, mailed on Jun. 17, 2021, 12 pages.
Office Action for Japanese Application No. 2023-523624 (with English translation), mailed Jun. 11, 2024, 14 pages.

* cited by examiner

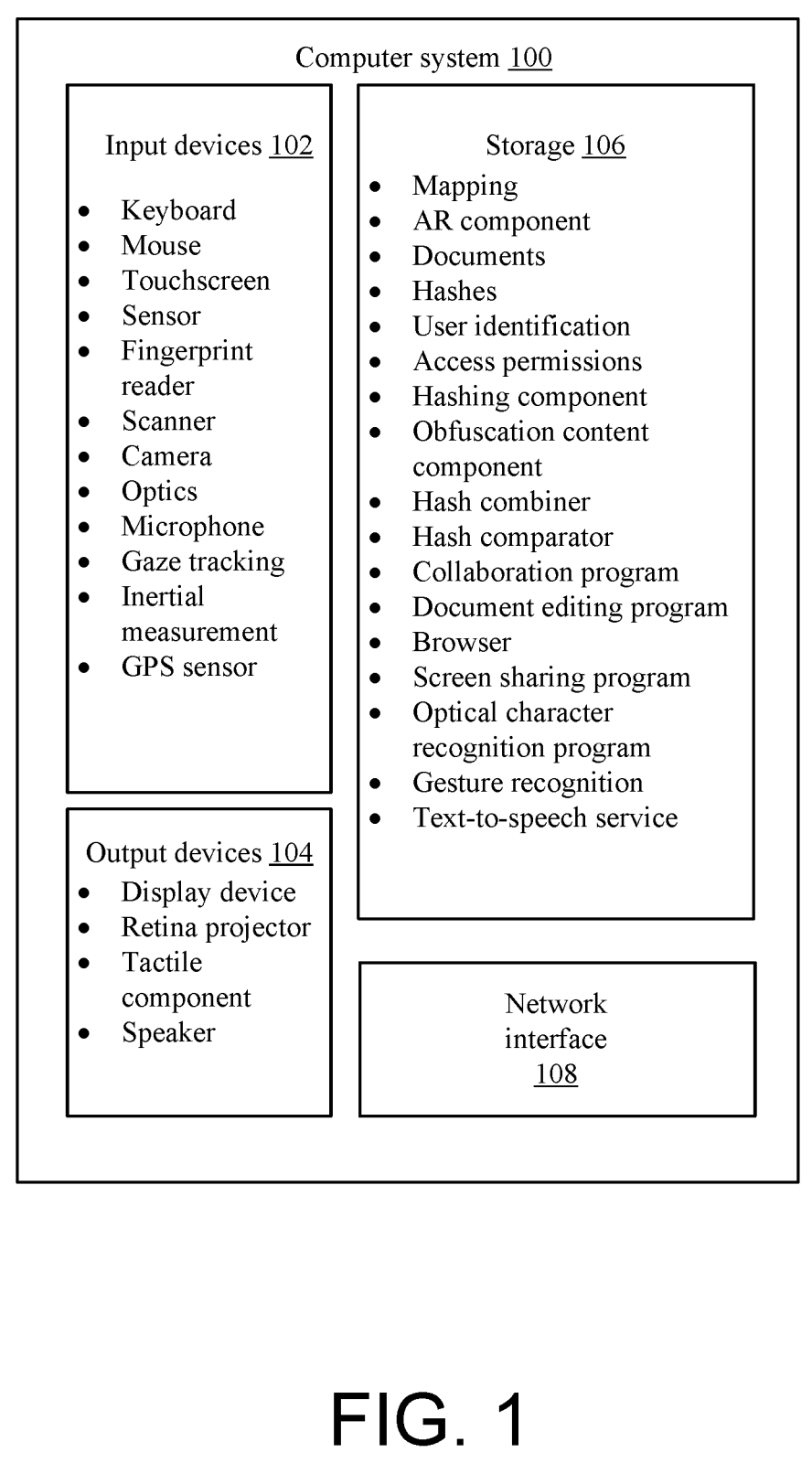

Computer system 100

Input devices 102

- Keyboard
- Mouse
- Touchscreen
- Sensor
- Fingerprint reader
- Scanner
- Camera
- Optics
- Microphone
- Gaze tracking
- Inertial measurement
- GPS sensor Storage 106

- Mapping
- AR component
- Documents
- Hashes
- User identification
- Access permissions
- Hashing component
- Obfuscation content component
- Hash combiner
- Hash comparator
- Collaboration program
- Document editing program
- Browser
- Screen sharing program
- Optical character recognition program
- Gesture recognition
- Text-to-speech service Output devices 104

- Display device
- Retina projector
- Tactile component
- Speaker

Network interface 108

FIG. 1

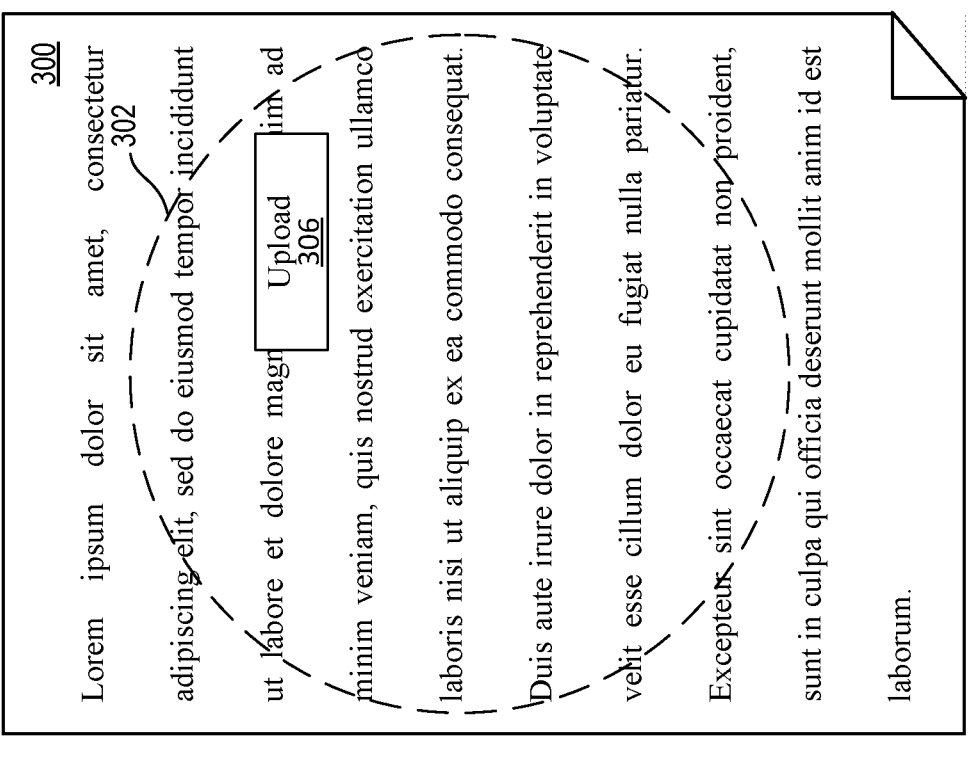

300

Lorem ipsum dolor sit amet, consectetur 302 adipiscing elit, sed do eiusmod tempor incididunt ut labore et dolore magn | Upload 306 | im ad minim veniam, quis nostrud exercitation ullamco laboris nisi ut aliquip ex ea commodo consequat. Duis aute irure dolor in reprehenderit in voluptate velit esse cillum dolor eu fugiat nulla pariatur. Excepteur sint occaecat cupidatat non proident, sunt in culpa qui officia deserunt mollit anim id est laborum.

Lorem ipsum dolor sit amet, consectetur 302 adipiscing elit, sed do eiusmod tempor incididunt ut labore et dolore magn | Check server 304 | im ad minim veniam, quis nostrud exercitation ullamco laboris nisi ut aliquip ex ea commodo consequat. Duis aute irure dolor in reprehenderit in voluptate velit esse cillum dolor eu fugiat nulla pariatur. Excepteur sint occaecat cupidatat non proident, sunt in culpa qui officia deserunt mollit anim id est laborum.

FIG. 3A

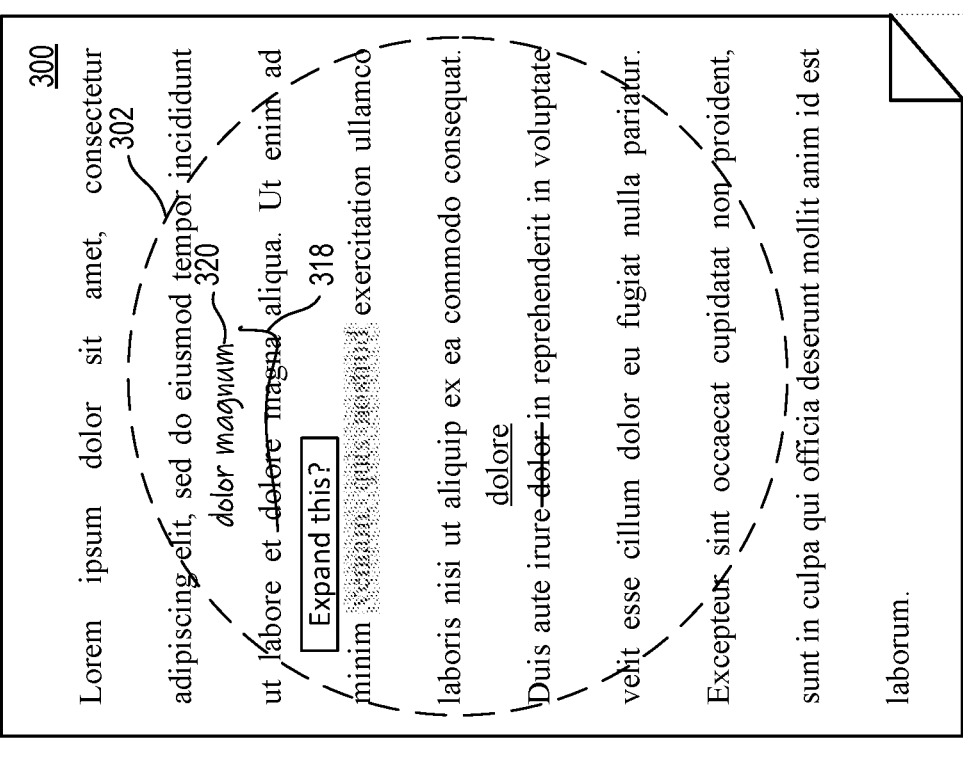

300

Lorem ipsum dolor sit amet, consectetur 302 adipiscing elit, sed do eiusmod tempor incididunt ut labore et dolore magna aliqua. Ut enim ad 314 minim ~~veniam quis nostrud~~ exercitation ullamco laboris nisi ut aliquip ex ea commodo consequat. 310 dolore

Duis aute irure ~~dolor~~ in reprehenderit in voluptate 316 velit esse cillum dolor ~~eu fugiat nulla~~ pariatur. 308

Excepteur sint occaecat cupidatat non proident, sunt in culpa qui officia deserunt mollit anim id est laborum.

Expand this? 312

Lorem ipsum dolor sit amet, consectetur 302 adipiscing elit, sed do eiusmod tempor incididunt dolor magnam 320 ut labore et ~~dolore magna~~ aliqua. Ut enim ad 318 minim ~~veniam quis nostrud~~ exercitation ullamco laboris nisi ut aliquip ex ea commodo consequat.

dolore

Duis aute irure ~~dolor~~ in reprehenderit in voluptate velit esse cillum dolor eu fugiat nulla pariatur.

Excepteur sint occaecat cupidatat non proident, sunt in culpa qui officia deserunt mollit anim id est laborum.

Expand this?

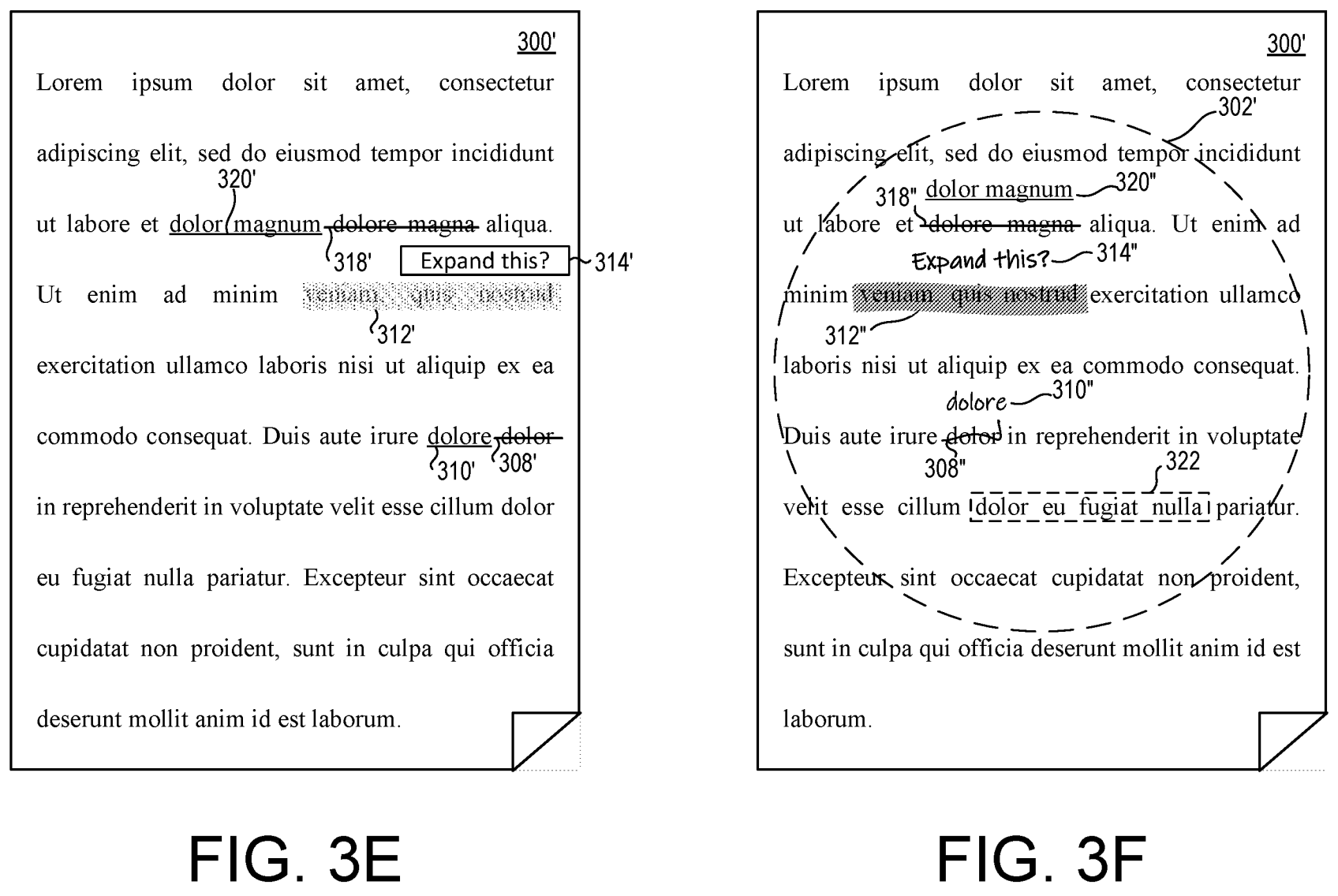

Lorem ipsum dolor sit amet, consectetur
302' adipiscing elit, sed do eiusmod tempor incididunt
320" dolor magnum
318" dolor magnum
ut labore et dolore magna aliqua. Ut enim ad
314"
Expand this?
minim veniam, quis nostrud exercitation ullamco
312"
laboris nisi ut aliquip ex ea commodo consequat.
dolore 310"
Duis aute irure dolor in reprehenderit in voluptate
308"
322
velit esse cillum dolor eu fugiat nulla pariatur.

Excepteur sint occaecat cupidatat non proident, sunt in culpa qui officia deserunt mollit anim id est laborum.

Lorem ipsum dolor sit amet, consectetur adipiscing elit, sed do eiusmod tempor incididunt
320'
ut labore et dolor magnum dolore magna aliqua.
318'    Expand this?
veniam, quis nostrud
312'
Ut enim ad minim exercitation ullamco laboris nisi ut aliquip ex ea commodo consequat. Duis aute irure dolore dolor
310'    308'
in reprehenderit in voluptate velit esse cillum dolor eu fugiat nulla pariatur. Excepteur sint occaecat cupidatat non proident, sunt in culpa qui officia deserunt mollit anim id est laborum.

FIG. 3E

My Drive

<u>500</u>

My Drive

My Drive <u>502</u>

<u>504</u>

Drives <u>506</u>

Recent <u>508</u>

Viewed
tangible
instance
<u>510</u>

MAPPING A TANGIBLE INSTANCE OF A DOCUMENT

CROSS-REFERENCE TO RELATED APPLICATION

This application is a 35 U.S.C. § 371 National Phase Entry Application from PCT/US2020/070674, filed on Oct. 19, 2020, entitled "MAPPING A TANGIBLE INSTANCE OF A DOCUMENT", the disclosure of which is incorporated herein by reference in its entirety.

TECHNICAL FIELD

This document relates to mapping a tangible instance of a document.

BACKGROUND

Historically, documents were typically made from durable media (e.g., paper). When two or more copies of the same document were generated, the copies were often distributed separately from each other and it was not always possible or practical to keep track of what happened to each individual copy. For example, once a person created a paper document, many things could happen to that piece of paper that the person may never learn of or be able to react to.

With the advent of computer technology came the possibility to maintain and edit documents in electronic form, and consequently to monitor the development and use of a document over time in a more organized and reliable fashion. However, this increased ability for temporal and logistical recordkeeping has applied only to the electronic records themselves that are maintained digitally by representations in form of ones and zeros. On the other hand, the physical instantiations of such electronic documents—which are necessary in order for any human to directly perceive or understand the document—are often subject to the same challenges that have historically been associated with documents on paper.

SUMMARY

In a first aspect, a computer-implemented method comprises: detecting, by a first computer system, first content of a tangible instance of a first document; generating, by the first computer system, a first hash using the first content, the first hash including first obfuscation content; sending, by the first computer system, the first hash for receipt by a second computer system; and receiving, by the first computer system, a response to the first hash generated by the second computer system, the response including information corresponding to a second document associated with the first content.

Implementations can include any or all of the following features. The second computer system controls a collaboration program for a collection of documents. The computer-implemented method further comprises sending, by the first computer system and based on the response, the first content for receipt by the second computer system. The second computer system generates a new document for the collaboration program using the first content. The computer-implemented method further comprises sending, by the first computer system and based on the response, a marked-up change of the first document for receipt by the second computer system. The collection of documents includes the second document. The second computer system generates a second hash using second contents of the second document, the second hash including second obfuscation content, and wherein the second hash is included in the response. The computer-implemented method further comprises verifying, by the first computer system and using the second hash, a correspondence between the first and second documents. The computer-implemented method further comprises receiving, by the first computer system, the second document from the second computer system. The second computer system performs detection of unauthorized access of the second contents upon receiving the first hash. The computer-implemented method further comprises receiving, by the first computer system, a history of access for a user of the first computer system, the history including an entry for accessing the second document based on the second computer system having received the first hash. The entry for accessing the second document is based on detecting that the user is proximate to at least one of a hardcopy of the first document or an on-screen presentation of the first document. The second computer system generates the entry in response to determining that the user has access permission to the second document. The user does not have access permission to the second document, and wherein the information corresponding to the second document includes a control for the user to request access permission to the second document. The user does not have access permission to the second document, and wherein the second computer system grants the access permission to the user in response to determining that the user is accessing the first document for at least a predetermined time. The first computer system identifies a user of the first computer system to the second computer system, and wherein the collection of documents is defined based on the user having access permission to the collection of documents. The computer-implemented method further comprises receiving, by the first computer system and from a user, a request for text-to-speech service of the first document, wherein the second document contains structure markup, and providing the text-to-speech service of the first document using the second document. The first computer system detects the first content based on the first document being presented on a display device. The display device is controlled by the first computer system and presents a screen sharing application on a desktop, wherein the first document is being screen shared with the first computer system using the screen sharing application. The first computer system further presents a browser on the desktop, and wherein the browser provides a control for opening the second document on the desktop using the collaboration program. The computer-implemented method further comprises facilitating, by the first computer system, dragging of a representation of the first document to trigger opening of the second document using the collaboration program. The dragging causes the second document to be presented on the desktop of the first computer system. The dragging causes the second document to be presented on another computer system based on the other computer system being detected by the first computer system. The first computer system comprises an augmented-reality (AR) headset, and wherein the first computer system detects the first content based on the first content being within a field of view of the AR headset. The computer-implemented method further comprises detecting, by the first computer system, that a user of the AR headset performs a gesture within the AR field of view, and in response moving a representation of the first document within the AR field of view according to the gesture. The moving of the representation facilitates opening of the second document on the first computer system using the collaboration program.

The moving of the representation facilitates opening of the second document, using the collaboration program, on another computer system detected by the first computer system. The computer-implemented method further comprises presenting, by the first computer system and using the information, second contents of the second document. The first computer system comprises an augmented-reality (AR) headset, wherein the first computer system detects the first content based on the first content being within a field of view of the AR headset, and wherein presenting the second contents comprises applying a first virtual annotation to the first document. The computer-implemented method further comprises receiving, by the first computer system, an audio input generated by a user corresponding to making a change in the first document, presenting in the AR field of view a second virtual annotation to the first document, and sending the change to the second computer system. The second document is publicly accessible and wherein the response includes the second document. The first and second documents are paper documents, and wherein the second computer system detects the second document being associated with the first document using the first hash and a second hash of the second document. The first and second hashes facilitate sharing of virtual annotations regarding the first or second documents between the first and second computer systems.

In a second aspect, a computer program product is tangibly embodied in a non-transitory storage medium, the computer program product including instructions that when executed by one or more processor(s) cause the one or more processor(s) to perform operations, the operations comprising: detecting, by a first computer system, first content of a tangible instance of a first document; generating, by the first computer system, a first hash using the first content, the first hash including first obfuscation content; sending, by the first computer system, the first hash for receipt by a second computer system; and receiving, by the first computer system, a response to the first hash generated by the second computer system, the response including information corresponding to a second document associated with the first content.

Implementations can include the following aspect. The computer program product includes instructions that when executed by the one or more processor(s) cause the one or more processor(s) to perform the method of any of claims 1 to 33.

Optional features of one aspect may be combined with any other aspect.

BRIEF DESCRIPTION OF DRAWINGS

FIG. 1 shows an example of a computer system.

FIGS. 3A-3F show examples relating to a tangible instance of a document.

FIG. 5 shows an example relating to a storage drive.

Like reference symbols in the various drawings indicate like elements.

DETAILED DESCRIPTION

Figure 2:
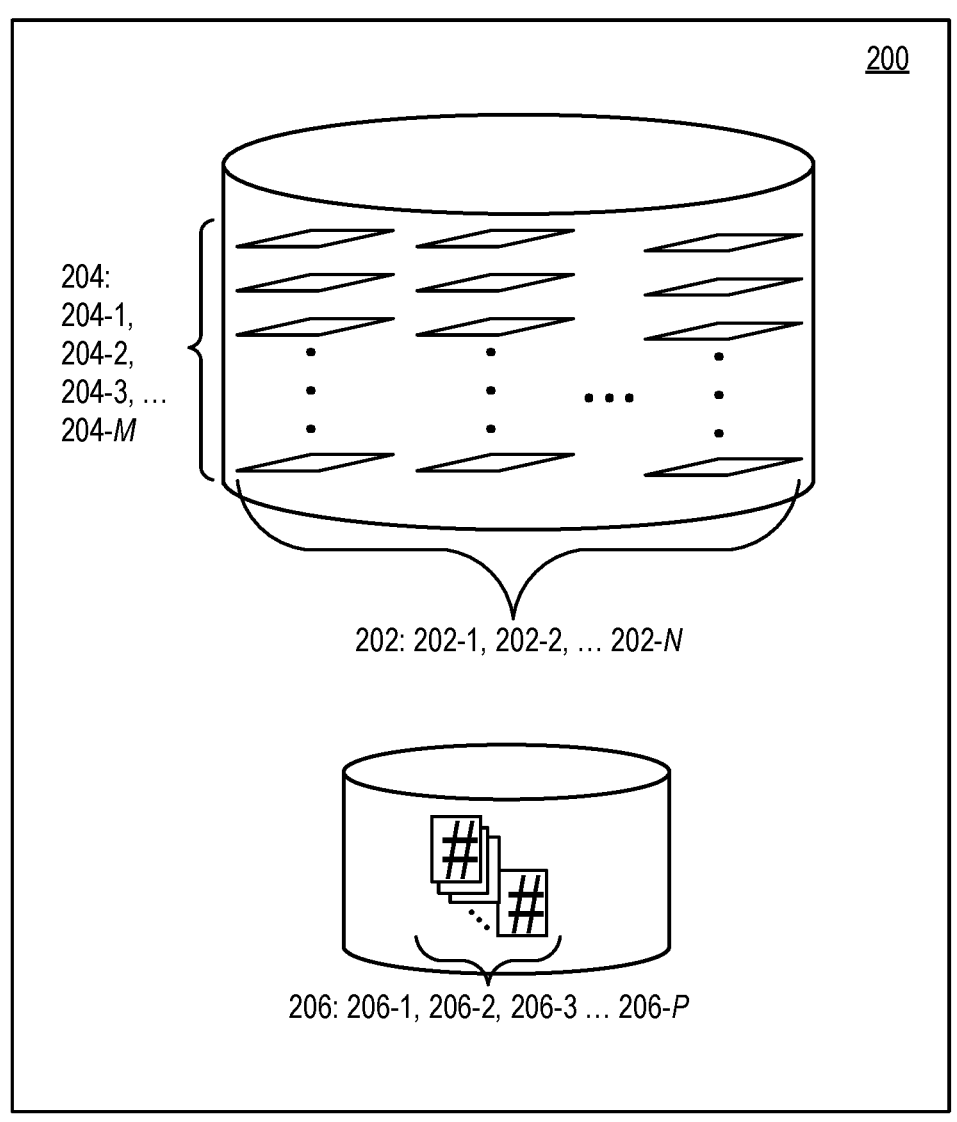
FIG. 2 shows an example of a storage of the computer system in FIG. 1.

This document describes examples of performing a mapping of a tangible instance (e.g., a paper copy or an on-screen presentation) of a document. The tangible instance can be mapped to the electronic document from which the tangible instance was created, or to another tangible instance of the same document (also when neither of the tangible instances was created from a common electronic original), to name just two examples. Such mapping can facilitate greater user experiences, enhanced protection for information that is personal or otherwise sensitive, improved recordkeeping, and/or increased information security.

Examples herein refer to computer systems. As used herein, a computer system includes, without limitation, any suitable combination of one or more devices configured with hardware, firmware, and software to carry out one or more of the computerized techniques described herein. A computer system as used herein may be a single computing device or multiple computing devices working collectively and in which the storage of data and the execution of functions are spread out amongst the various computing devices.

Examples herein refer to operations being performed by a client or a server, or as taking place at a client side or at a server side. The terms client and server are used herein for illustrative purposes only and are not limited to only particular types of computer systems or devices. As used herein, a client or a server can include any type of computer system, unless otherwise indicated. For example, a server can include a physical server and/or a virtual machine. For example, a client can include a wearable device, a tablet, a digital audio player, a video game console, a desktop computer, a laptop computer, a projector, a television, an electronic billboard, a cell phone, a personal digital assistant, and/or a smart phone.

Examples herein refer to augmented reality (AR). As used herein, AR refers to a user experience in which a computer system facilitates a sensory perception that includes at least one virtual aspect and at least one aspect of reality. AR can be provided by any of multiple types of computer system, including, but not limited to, a wearable device. As used herein, an AR headset refers to any computer system that facilitates AR. An AR headset can include, but is not limited to, AR glasses, another wearable AR device, a tablet, or a laptop computer. In some types of AR, the user can perceive the aspect of reality directly with his or her senses without intermediation by the computer system. For example, some AR headsets are designed to beam an image (e.g., the virtual aspect to be perceived) to the user's retina while also allowing the eye to register other light that was not generated by the AR headset. As another example, an in-lens micro display can be embedded in a see-through lens, or a projected display can be overlaid on a see-through lens. In other types of AR, a computer system can improve, complement, alter, and/or enable the user's impression of reality (e.g., the real aspect to be perceived) in one or more ways. In some implementations, AR is perceived on a screen of a computer system's display device. For example, some AR headsets are designed with camera feedthrough to present a camera image of the user's surrounding environment on a display device positioned in front of the user's eye.

Examples herein refer to a gesture being detected by an AR headset. As used herein, detection of a gesture includes any way that an AR headset can recognize input from a user. A gesture can include, but is not limited to, any of: a motion with a body part (e.g., a hand, finger, or arm) detected visually; a motion of a body part (e.g., the head) detected by accelerometer or other inertial measurement unit; or an input made using a controller (e.g., a handheld controller) and detected by the AR headset.

Examples herein refer to documents. As used herein, a document is information in a medium. For example, an electronic document refers to information in digital form (e.g., as a computer-readable file on a storage medium). As another example, a hardcopy document refers to printed information (e.g., information printed on paper). As another example, an on-screen presentation refers to information shown on a display device. Examples herein refer to a tangible instance of a document. As used herein, a tangible instance of a document includes any embodiment of the document in a form where it can be perceived (and perhaps understood) by a human being. As used herein, a tangible instance of a document includes at least a hardcopy of the document or an on-screen presentation of the document. A tangible instance can correspond to a document if the tangible instance is essentially identical to the document. For example, the tangible instance corresponds to the document if the tangible instance was generated from the document.

Examples herein refer to the content of a document. As used herein, the content includes some or all of the information of the document.

Examples herein refer to generating a hash using content of a document. As used herein, generating a hash or hashing a document includes any and all ways of creating a virtually unique representation of the document for identification purposes. The hash can be used for verifying that two or more documents correspond to each other (e.g., that they are virtually identical) without conveying personal or otherwise sensitive information to the verifier. In some forms of hashing, portions of text can be selected. Characters or words at regular intervals can be selected to hash a document. In some implementations, n-grams of words can be identified (n being an integer greater than one), and every mth word of the n-gram can be chosen for the hash (m being an integer greater than one and smaller than or equal to n) to form a word string. For example, each of multiple word strings can be generated by choosing every other word from text of the document. The words chosen for the hash can be looked up in at least one dictionary to avoid choosing a word that constitutes personal or otherwise sensitive information. In some implementations, characters of text at particular locations can be selected for the hash. For example, the first character of every line of text can be used. In some implementations, digital information about the document can be converted into a hash. For example, an optical character recognition (OCR) of the document can be converted (e.g., compressed) into digital bits and a sub-portion of the digital information can be selected. In some implementations, a hash can be based on a topography of the document. For example, the hash can be based on the shape, placement, orientation, and/or organization of content in the document. In some implementations, the hash can at least in part be based on one or more characteristics relating to the arrangement of the text or a typeface of the text. For example, the font or font family, size of font, glyph spacing such as letter spacing, word spacing, and/or line height can be used. In some implementations, a so-called "lazy hash" can be performed that is more robust against minor alterations later being made in the document. For example, the hashing can selectively be applied to some but not all of the contents of the document. In some implementations, a hash of a document can include a fingerprint of the contents of the document. The generated hash for one document should have virtually no likelihood of colliding with a hash generated from another document unless one of the documents is a copy of the other. For example, the chance of two unrelated documents having colliding hashes can be on the order of one in about a trillion.

Examples herein refer to obfuscation content. As used herein, obfuscation content is content not originating in a document that is combined with a hash of the document. In some implementations, obfuscation content is content that lacks discernable meaning (e.g., nonsense text or other characters or symbols). The obfuscation content can be included in the hash to virtually eliminate the chance of revealing personal or otherwise sensitive information based on sending the hash to someone. In some implementations, the hash involves selecting word strings from the document (e.g., by choosing every other word until reaching the applicable word string length). The obfuscation content can then include word strings of the same length(s) that do not occur in the document. For example, the obfuscation word strings can include words selected randomly from a dictionary. In some implementations, the hash can include a particular proportion of obfuscation content. For example, when there are fewer than a dozen word strings taken from the document, about one hundred or more word strings of obfuscation content can be included in the hash.

Examples herein refer to a collaboration program for a collection of documents. As used herein, a collaboration program allows multiple computer systems to simultaneously access the same document(s) of the collection of documents. In some implementations, the collaboration program allows users to create, view and edit one or more files online while collaborating with other users on the file(s) in real-time. For example, a collaboration program can be designed for word processing, spreadsheet operations, and/or slide presentations.

Examples herein refer to access permission to an electronic document of a computer system. As used herein, a user has access permission to an electronic document if the user has sufficient credentials to the computer system so as to be allowed to at least perceive a tangible instance of the document.

Examples herein refer to a browser. As used herein, a browser refers to a software application which can retrieve and display information; a browser extension; and/or any suitable combination thereof. A browser can use a uniform resource locator (URL) to retrieve contents of a document (e.g., a document of a collaborative program) and thereafter present at least part of the document to a user.

Examples herein refer to a screen sharing application. As used herein, a screen sharing application is software that allows one computer system to present at least a portion of its current screen content at the screen of another computer system substantially in real time. A screen sharing application can be included in a videoconferencing application, to name just one example.

FIG. 1 shows an example of a computer system 100. The computer system 100 can be used with one or more other examples described elsewhere herein. The computer system 100 can be designed to have at least one processor execute instructions stored in a computer-readable medium. For example, the computer system 100 can include some or all components described below with reference to FIG. 11.

In some implementations, the computer system 100 can be characterized as performing in a client role and/or as being implemented at a client side. For example, the computer system 100 can be an AR headset (e.g., a set of AR glasses or another AR device) that detects tangible instances of documents and provides hashes of them to a server. In some implementations, the computer system 100 can be characterized as performing in a server role and/or as being implemented at a server side. For example, the computer system 100 can perform a search based on the received hash; if the server finds a match, further information can be provided to the client.

The computer system 100 includes input devices 102. In some implementations, the input devices 102 can include a keyboard or other button, mouse, touchscreen, one or more sensors, a fingerprint reader, a scanner, a camera or other image sensor, optics, a microphone, a gaze tracking component, an inertial measurement unit, and/or a global positioning system (GPS) sensor. The camera can be used to capture a view of a tangible instance of a document and in detecting content thereof. The touchscreen can allow a user to generate inputs as described herein. The microphone can allow the user to enter a voice command, such as to perform an operation or to make a change in a document. The gaze tracking component can allow an AR headset to determine where the user is currently looking (e.g., with reference to a document). The inertial measurement unit can detect if the computer system 100 is being moved (e.g., to detect proximity to another computer system). The GPS sensor can detect a location of the computer system 100 (e.g., to determine presence of another computer system).

The computer system 100 can include output devices 104. The output devices 104 can include a display device, a retina projector, a tactile component, and/or a speaker. The display device and/or the retina projector can serve to generate visual output that will provide a virtual aspect to be perceived by a user. For example, one or more documents, document edits, pages, windows, and/or desktops can be presented. The speaker can serve to provide audio output, for example as generated by a text-to-speech application.

The computer system 100 can include at least one storage 106. The storage 106 can include mapping functionality; an AR component; documents; hashes; user identification records for at least one user; access permissions for at least one user; a hashing component to hash content; an obfuscation content component to generate obfuscation content; a hash combiner to include obfuscation content in a hash; a hash comparator to compare two or more hashes; a collaboration program for a collection of documents; a document editing program (e.g., for non-collaborative documents); a browser; a screen sharing program (e.g., as part of a video-conferencing application); an OCR program; a gesture recognition program; and/or a text-to-speech service application.

For example, the mapping functionality can be programmed to perform some or all operations as described herein (e.g., to provide linking between a tangible instance and an electronic document, and/or to provide linking between two or more tangible instances).

As another example, the AR component can be programmed to operate according to some or all examples described herein (e.g., to capture content, and/or to send, receive, or present information based on mapping).

As another example, the documents can be captured (e.g., scanned) by the computer system 100, and/or received from another computer system.

As another example, the hashes can be generated by the computer system 100, and/or received from another computer system.

As another example, the user identification records can specify who the user is and/or identify one or more other computer systems associated with the user.

As another example, the access permissions can specify whether the user is allowed to access an electronic document in the computer system 100 or another computer system.

As another example, the hashing component can hash content of a document so as to avoid revealing personal or otherwise sensitive information.

As another example, the obfuscation content component can generate content unrelated to document content so as to avoid revealing personal or otherwise sensitive information.

As another example, the hash combiner can combine hashed content with obfuscation content to generate a hash that avoids revealing personal or otherwise sensitive information.

As another example, the hash comparator can determine whether two or more hashes relate to corresponding documents.

As another example, the collaboration program can allow a user of the computer system 100 and another user of a separate computer system to simultaneously access and edit an electronic document.

As another example, the document editing program can allow a user of the computer system 100 to edit a document separately from the collaboration program.

As another example, the browser can allow a user of the computer system 100 to view documents and/or run programs, whether local to the computer system 100 or from a remote location.

As another example, the screen sharing program can allow a user of the computer system 100 to view a tangible instance of a document shared from another computer system, and/or to share a tangible instance of a document with such other computer system.

As another example, the OCR program can capture content from a tangible instance of a document.

As another example, the gesture recognition program can track a position of a user of the computer system 100 or a part of their body, such as to control an AR headset.

As another example, the text-to-speech service application can provide a speech output to a user of the computer system 100 based on the content of a document (e.g., from an electronic document or a tangible instance thereof).

The computer system 100 can include at least one network interface 108 that allows communication between the computer system 100 and one or more other systems and/or devices. The network interface 108 can be configured for wireless and/or wired communication. For example, the network interface 108 can facilitate communication to search for corresponding documents. As another example, the network interface 108 can facilitate detection of computer systems associated with (e.g., being nearby) the computer system 100.

FIG. 2 shows an example of a storage 200 of the computer system 100 in FIG. 1. The storage 200 can be used with one or more other examples described elsewhere herein. For example, the storage 200 can include some or all components of the storage 106 in FIG. 1, or vice versa.

The storage 200 includes N number of documents 202, where N is any integer. Here, documents 202 are schematically shown as document 202-1, document 202-2, . . . and document 202-N, respectively. Each of the documents 202 can exist in one or more versions 204. Here, each of the documents 202 is schematically shown as having a version 204-1, a version 204-2, a version 204-3, . . . and a version 204-M, respectively, where M is any integer. For example, when a change is made to one of the documents 202, the revision can be incorporated into an existing version of the document, or the document including the change can be considered a new version of the earlier document, or a new document can be created. Other approaches for version management can be used. In some implementations, a server that controls a collaboration program makes the documents 202 available to users.

The storage 200 includes P number of hashes 206, where P is any integer. Here, hashes 206 are schematically shown as hash 206-1, hash 206-2, hash 206-3, . . . and hash 206-P, respectively. In some implementations, one or more of the hashes 206 can be generated based on a tangible instance of a document. The hash can be provided to another computer system (e.g., to a server) to determine whether any other document corresponds to the document on which the hash was based. As another example, a computer system (e.g., a server) can generate a hash of a found document and provide the hash to another computer system (e.g., a client) to allow the other computer system to verify that the found document corresponds to a tangible instance of a document at the other computer system.

The following examples relate to using document mapping as described herein to improve document collaboration both as an AR experience and otherwise. FIGS. 3A-3F show examples relating to a tangible instance of a document. Any of the examples regarding the tangible instance can be used with one or more other examples described elsewhere herein. In some implementations, the tangible instance can be a hardcopy or an on-screen presentation. The document includes text, which is for purposes of simplicity here represented by placeholder Latin text in the tangible instance. The document may be longer (e.g., include more content) than what is currently reflected by the tangible instance.

In FIG. 3A, a tangible instance 300 is perceived by a user. An AR field of view 302 is here schematically represented using a dashed circle. In some implementations, a user positioned at the tangible instance 300 is wearing an AR headset that defines the AR field of view 302. Here, the user can see the tangible instance 300 both within and outside the AR field of view 302, and can perceive virtual aspects, here a control 304, within the AR field of view 302. The content of the document that is currently within the AR field of view 302 may be visible to and therefore processable by the computer system of the AR headset. For example, the AR headset can detect content (e.g., text) of the tangible instance 300 based on the content being within the AR field of view 302. For example, the AR headset comprises a display device. The AR headset may comprise a camera, e.g., to capture the tangible instance. Optionally, images captured by means of the camera can be displayed on the display device of the AR headset. Alternatively, or in addition, virtual content may be displayed on the display device of the AR headset. For example, the display device of the AR headset is displaceable with respect to the tangible instance. For example, in use, the display device of the AR headset can be arranged between one or both of the user's eyes and the tangible instance that is in the AR field of view 302.

The control 304 is generated by a computer system of the AR headset. The control 304 can allow the user to trigger mapping of the tangible instance 300. For example, such mapping can be performed to search for any electronic document that may correspond to (e.g., that may have been the origin of) the tangible instance 300. As another example, such mapping can be performed to search for any other tangible instance of the same document.

Mapping can be performed without jeopardizing personal or otherwise sensitive information. Before contacting a server regarding the tangible instance 300, a hash of the content of the tangible instance 300 can be generated, the hash also including obfuscation content. The user can activate the control 304 by performing a gesture within the AR field of view 302 (e.g., with a hand or finger), or by way of a dedicated input function on the AR headset, to name just two examples. That is, user activation of the control 304 causes the AR headset to send to the server only the hash associated with the tangible instance 300 (e.g., its hash, and obfuscation content), which includes no sensitive information.

The server that receives the hash of the tangible instance 300 that was sent by the AR headset can use the hash in one or more searches. In some implementations, the server searches a collection of documents associated with a collaboration program. The scope of the document collection to be included in the search can be defined based on the user's access permission(s). For example, only documents for which the user has access permission are included in the search. As another example, the search includes publicly accessible documents (e.g., documents that are available to anyone on the internet) and documents explicitly shared with the user. The search can involve ranking two or more search hits according to the server's level of confidence that the respective search hit is a document that corresponds to the tangible instance 300. For example, when the hash is a sufficiently unique representation of the document, the search can produce either one hit if a corresponding document exists at the server, or no hits if no corresponding document exists at the server.

The server can generate a response to the receipt of the hash and send the response to the AR headset. The response can include information corresponding to at least one document that was found in the searching based on the hash. In some implementations, the server can perform its own hashing of the found document. Such hashing can involve generating a hash of the document and including obfuscation content in the hash. For example, the server can perform the same or a different kind of hashing than the AR headset performed.

The above examples illustrate that a computer-implemented method can include: detecting, by a first computer system (e.g., the AR headset), first content (e.g., within the AR field of view 302) of a tangible instance of a first document (e.g., the tangible instance 300); generating, by the first computer system (e.g., in response to activation of the control 304), a first hash using the first content, the first hash including first obfuscation content; sending, by the first computer system, the first hash for receipt by a second computer system (e.g., the server); and receiving, by the first computer system, a response to the first hash generated by the second computer system, the response including information (e.g., the server's hash) corresponding to a second document associated with the first content.

After receiving the response generated by the server, the AR headset can use the response to verify a correspondence between the tangible instance 300 and the document found by the server (e.g., that the documents are the same). For example, this can allow the AR headset to gauge whether the server has done a reliable job in searching based on the hash. The AR headset can check the server's hash against the tangible instance 300.

After receiving the response generated by the server, the AR headset can offer the user an opportunity to send some or all contents of the tangible instance 300 to the server. FIG. 3B illustrates that the AR headset can present a control 306 within the AR field of view 302. The user can activate the control 306 by performing a gesture within the AR field of view 302 (e.g., with a hand or finger), or by way of a dedicated input function on the AR headset, to name just two examples. For example, activating the control 306 can cause the AR headset to send one or more captured images of the tangible instance 300 to the server. As another example, text of the tangible instance 300 can be sent. In some implementations, the server can generate a new electronic document, or a new version of the found document, based on the content provided by the AR headset. In some implementations, the AR headset sends a marked-up change of the tangible instance 300 to the server, the marked-up change corresponding to a difference that the AR headset has detected between the tangible instance 300 and the document that was found by the server.

In some implementations, the server sends the content of the found document to the AR headset. For example, this can be done in plaintext if the found document is publicly available, or otherwise upon the server obtaining confirmation on behalf of the AR headset. Such confirmation can include a verification that the user of the AR headset has access permission to the found document, and/or a notification from the AR headset that the found document does indeed correspond to the tangible instance 300 and that the AR headset wishes to access the found document.

FIG. 3C shows an example where the AR headset presents virtual annotations of the tangible instance 300 within the AR field of view 302. That is, the virtual annotations being presented to the user of the AR headset are virtual aspects including marked-up changes that augment the user's view of reality (here, the view of the tangible instance 300). In this example, the virtual annotations include a deletion 308 of a word and an insertion 310 of another word instead of the deleted one. In this example, the virtual annotations also include a highlight 312 of a passage in the tangible instance 300 and a comment 314 associated with the highlighted passage.

Some of the virtual annotations are edits that were entered by another user into an electronic document that the server has found based on searching with the hash of the tangible instance 300. Gaze tracking can be performed to determine whether that other user is currently focusing on any particular part of the electronic document. Here, a gaze indicator 316 can be presented in the AR field of view 302 based on such gaze tracking of the other user. That is, in this example the document that the server found was part of a collection of documents associated with a collaboration program. Note that the tangible instance 300 in this example was not a live presentation of the document that the server would later find; rather, the tangible instance 300 may have been a hardcopy of that document or an on-screen presentation shown in a conference room, to name just two examples. Instead, the mapping that was performed on the tangible instance 300 has here allowed the user that was perceiving the tangible instance 300 to gain access to realtime virtual updates from the electronic document that has been found to correspond to the tangible instance 300.

In another scenario than the one just described, the document that the server found may not be part of a collection of documents associated with a collaboration program. In some implementations, the server may have found the document by performing a search using the hash received from the AR headset, and another hash that was received from another computer system. For example, the other computer system may have uploaded its hash based on detecting content from another tangible instance (i.e., not the tangible instance 300). Based on the server determining that these two hashes correspond to each other, the server can deem that the respective tangible instances correspond to each other. For example, this can allow a mapping between two tangible instances to be established also when the server does not find any electronic document corresponding to the tangible instances.

Mappings as described herein can improve version management and/or detection of unauthorized access. Assume, for example, that the tangible instance 300 is an unpublished manuscript of a motion picture that is under development by a movie studio. The hash of the tangible instance 300 can allow the server to detect that a user who does not have access permission to the movie manuscript is currently viewing it.

The user that has the AR headset can perform editing of the tangible instance 300. Once a mapping has been established, such editing can be shared with one or more other users, for example as will now be described. FIG. 3D shows that the user that has the AR headset has marked a deletion 318 of an expression and an insertion 320 of another expression instead of the deleted one. The edits entered by the user that has the AR headset can be made with a pen if the tangible instance 300 is a hardcopy, or electronically if the tangible instance 300 is an on-screen presentation. If the AR field of view 302 includes the portion of the tangible instance 300 where the edits were made, sharing of the edits can be performed.

If the edits are shared with another user, that other user can view the edits in connection with their corresponding tangible instance. FIGS. 3E-3F shows a tangible instance 300' that is being perceived by another user. The tangible instance 300' is the one that the server found based on searching with the hash in the above examples. Beginning with FIG. 3E, the other user is currently working with the tangible instance 300' in electronic form. As such, the other user may currently not be perceiving AR. In this example, the annotations that the other user has made of the tangible instance 300' include a deletion 308' to which the deletion 308 (FIG. 3C) corresponds, an insertion 310' to which the insertion 310 (FIG. 3C) corresponds, a highlight 312' to which the highlight 312 (FIG. 3C) corresponds, and a comment 314' to which the comment 314 (FIG. 3C) corresponds. These annotations by the other user are electronically made in the document underlying the tangible instance 300' and are not virtual aspects.

One or more annotations that were entered in FIG. 3D by the user that has the tangible instance 300 can also be visible in relation to the tangible instance 300' in FIG. 3E. Here, such annotations include a deletion 318' corresponding to the deletion 318 (FIG. 3D), and an insertion 320' corresponding to the insertion 320 (FIG. 3D).

Turning now to FIG. 3F, the tangible instance 300' is here a hardcopy (e.g., a paper printout). The other user that is perceiving the tangible instance 300' is here using an AR headset that defines an AR field of view 302' relative to the tangible instance 300'. The annotations that the other user has made of the tangible instance 300' include a deletion 308" to which the deletion 308 (FIG. 3C) corresponds, an insertion 310" to which the insertion 310 (FIG. 3C) corresponds, a highlight 312" to which the highlight 312 (FIG. 3C) corresponds, and a comment 314" to which the comment 314 (FIG. 3C) corresponds. These annotations by the other user are made by hand (e.g., using a pen or highlighter) on the hardcopy that is the tangible instance 300', and are not virtual or electronic aspects.

The annotations made in FIG. 3D can be presented in the AR field of view 302' of FIG. 3F. Here, such annotations include a deletion 318" corresponding to the deletion 318 (FIG. 3D), and an insertion 320" corresponding to the insertion 320 (FIG. 3D). A gaze indicator 322 can be presented in the AR field of view 302' based on gaze tracking of the user that has the tangible instance 300 (FIGS. 3A-3D).

The above examples illustrate edits that were made either electronically to a document in digital form, or manually on a hardcopy. Other ways of entering an edit, annotation, or other marked-up change with regard to an electronic document, or any other command, can be used. In some implementations, an audio interface can register an audio input that a user makes and interpret it as a voice command to make a change in an electronic document. With reference to FIG. 3E for example, instead of using a keyboard to enter the deletion 308' and the insertion 310', the user can state "line six, replace dolor with dolore."

Mappings as described herein can improve accessibility to visual information, such as for persons with low vision. Assume, for example, that a user perceiving the tangible instance 300 in FIG. 3A wishes to request a text-to-speech service for the content. If the text-to-speech service were performed based on the text of the tangible instance 300 as detected by the AR headset, the text-to-speech service may have to infer certain structural aspects of the document when generating the speech, such as the order in which to read juxtaposed paragraphs, or the location where a paragraph ends and the next one begins. On the other hand, if the tangible instance 300 corresponds to an electronic document, that electronic document may contain structure markup which can be used by the text-to-speech service. The structure markup can include elements according to any suitable markup language, including, but not limited to, Hypertext Markup Language. The text-to-speech service can then refer to the structural notions reflected by the markup elements of the electronic document to better render the text of the tangible instance 300 as speech.

Figure 4A:
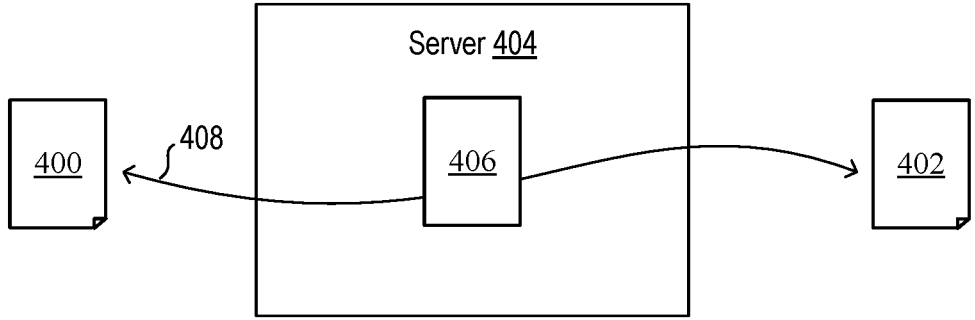
FIGS. 4A-4B conceptually show examples relating to tangible instances and a computer system.
Figure 4B:
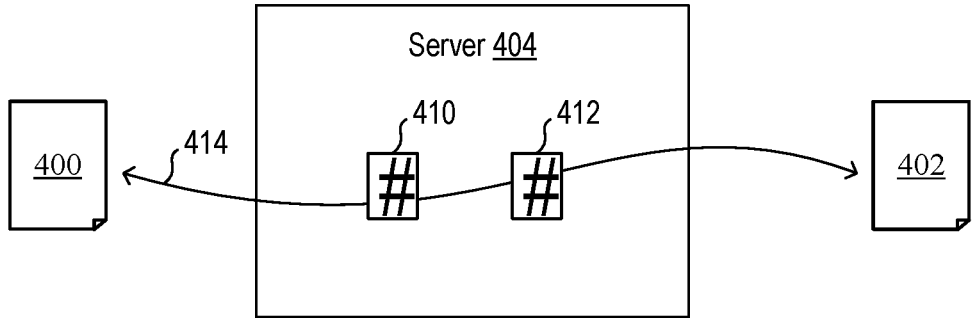

FIGS. 4A-4B conceptually show examples relating to tangible instances 400 and 402 and a computer system 404. The tangible instances 400 and 402 and the computer system 404 can be used with one or more other examples described elsewhere herein.

In FIG. 4A, the computer system 404 includes an electronic document 406 to which each of the tangible instances 400 and 402 corresponds. For example, each of the tangible instances 400 and 402 is a hardcopy or an on-screen presentation of the electronic document 406. The computer system 404 may have identified the electronic document 406 upon receiving a hash from a computer system associated with the tangible instance 400; similarly, the computer system 404 may have identified the electronic document 406 upon receiving a hash from a computer system associated with the tangible instance 402. Accordingly, each of the tangible instances 400 and 402 is mapped to the electronic document 406, and the tangible instances 400 and 402 have a link 408 between each other by way of the electronic document 406. The link 408 can be used for identification and/or information transfer in either or both directions between the tangible instances 400 and 402.

In FIG. 4B, the computer system 404 does not necessarily include any electronic document to which each of the tangible instances 400 and 402 corresponds. Here, the computer system associated with the tangible instance 400 has provided a hash 410 of the tangible instance 400 to the computer system 404. Similarly, the computer system associated with the tangible instance 402 has provided a hash 412 of the tangible instance 402 to the computer system 404. Accordingly, the tangible instance 400 is mapped to the hash 410, and the tangible instance 402 is mapped to the hash 412. Moreover, the computer system 404 can determine that the hashes 410 and 412 correspond to each other (e.g., because they are identical). That is, the computer system 404 can detect that the tangible instance 402 is associated with the tangible instance 400 using the hashes 410 and 412. The tangible instances 400 and 402 therefore have a link 414 between each other by way of the hashes 410 and 412. The link 414 can be used for identification and/or information transfer in either or both directions between the tangible instances 400 and 402. That is, the link 414 provides a realtime dynamic connection between the tangible instances 400 and 402 also when they are hardcopies (e.g., paper documents). For example, the link 414 can facilitate sharing of a virtual annotation regarding the tangible instances 400 or 402 between their respective computer systems.

Figure 5:
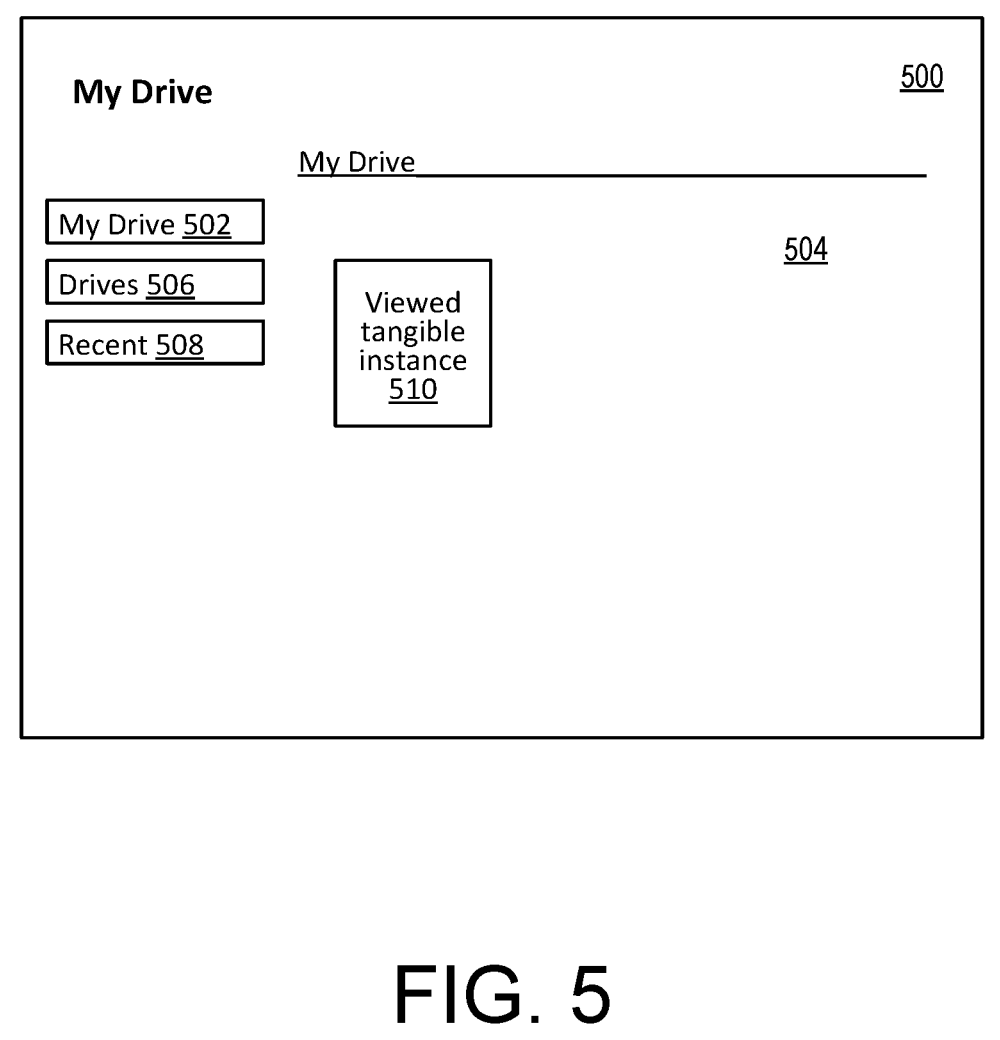

Mappings as described herein can improve the process of documenting information in visual form, such as by providing a convenient way of electronically capturing content of tangible instances. FIG. 5 shows an example relating to a storage drive 500. In some implementations, the storage drive 500 can be provided as a central storage solution (e.g., a file back-up service) for the files and folders of multiple users and can allow access to the files using multiple types of devices. For example, the storage drive 500 can be made available in a cloud.

In the storage drive 500, a user can activate a control 502 to see the names of that user's files in a pane 504. A control 506 can be used to access another drive than the storage drive 500 (e.g., a drive that does not belong to, but has been shared with, the user). A control 508 can be activated to see a history of documents that the user has recently accessed.

Assume that the user who controls the storage drive 500 comes into possession of a paper document that the user is deciding whether to keep or recycle. For example, the paper document can be a user manual for a product that the user has bought. Rather than recycling the user manual and hoping to never need it again in the future, the user can don an AR headset and flip through some or all pages of the paper document. Similar to examples described above with reference to FIGS. 3A-3B, the AR headset can here capture the content of the user manual and provide that information to a server, in this example the server controlling the storage drive 500. Accordingly, when the user thereafter accesses the storage drive 500, the pane 504 can include an item 510 corresponding to the user manual that the user paged through, thus providing a convenient way of maintaining this information.

Figure 6B:
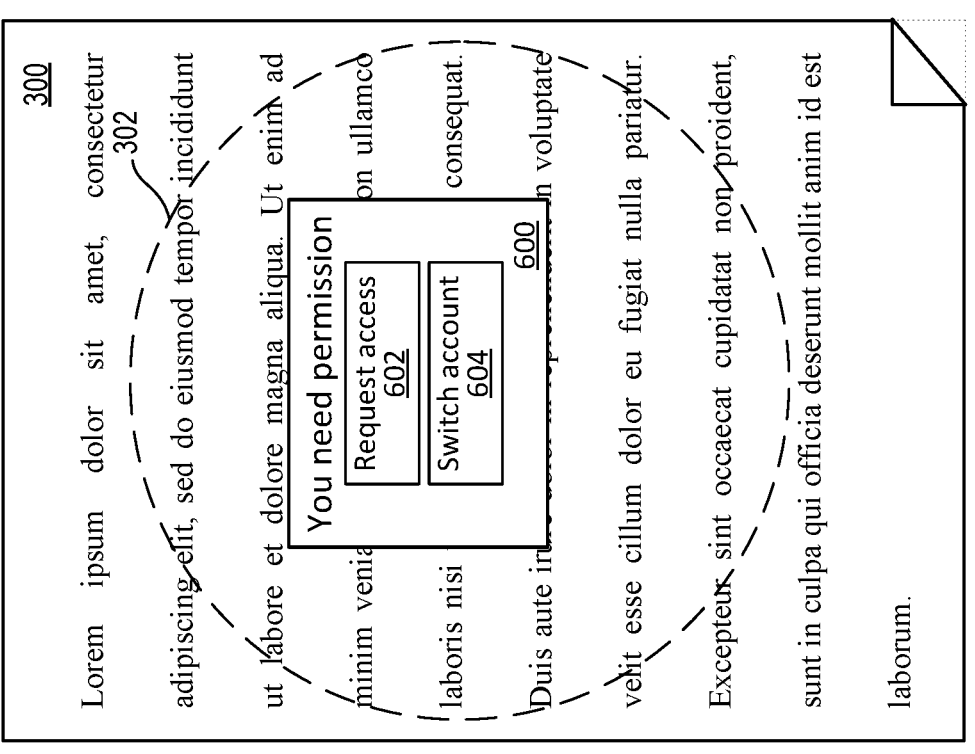
FIG. 6B shows that the user is viewing the tangible instance and the AR field of view of FIGS. 3A-3D.
Figure 6A:
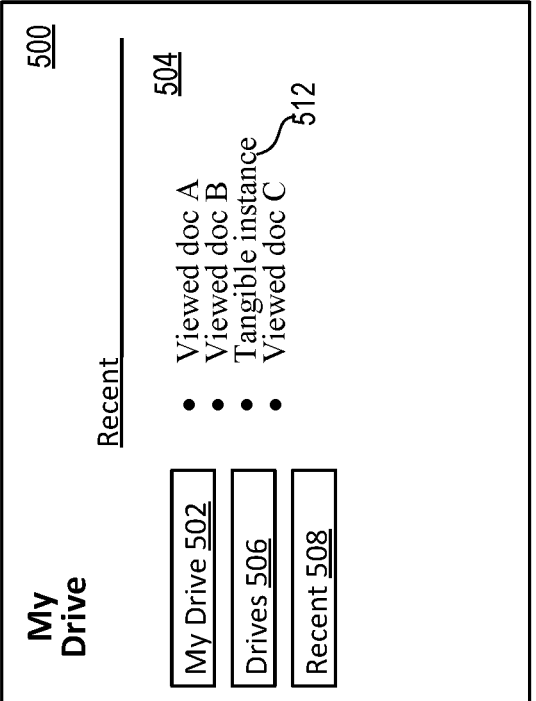
FIG. 6A shows an example relating to the storage drive of FIG. 5.

Mappings as described herein can improve access to visual information previously viewed by a user, such as by providing a record of tangible instances the user has seen. FIG. 6A shows an example relating to the storage drive 500 of FIG. 5. With reference again briefly to FIG. 3A, that example describes an AR headset providing a server with a hash of the tangible instance 300. That informs the server that the user associated with the AR headset has perceived the tangible instance 300. The present example involves the situation where the server determines that the user has access permission to the document that the server has found using the hash. The server therefore adds an identifier for the tangible instance 300 as an entry in that user's history of accessed documents. In some implementations, the storage drive 500 provides the control 508 where the user can see a listing of recently viewed documents. Upon activation of the control 508, the pane 504 can present respective entries for the history of access, here including an entry 512 corresponding to the tangible instance 300. That is, because the user wore the AR headset while observing the tangible instance 300 (e.g., a printed document or an on-screen presentation), the storage drive 500 is updated to reflect the tangible instance 300 in the user's history of access. In some implementations, the entry 512 can be based on detecting that the user is proximate to (e.g., views) the tangible instance 300. For example, the tangible instance 300 can be a hardcopy document or an on-screen presentation of an electronic document.

In the situation of FIG. 3A, if the user does not have access permission to the electronic document that the server finds using the hash, then additional interaction can occur. FIG. 6B shows that the user is viewing the tangible instance 300 and the AR field of view 302. As mentioned, upon searching with the hash provided by the AR headset, the server identifies a corresponding electronic document and determines that the user does not have access permission to it. The server can now cause the AR headset to present a prompt 600 informing the user that they do not have access permission to the electronic document to which the tangible instance 300 corresponds. The prompt 600 can provide the user with one or more actions that can be performed. In some implementations, a control 602 allows the user to submit a request for permission to access the electronic document. For example, the server can forward such a request for consideration by the person who is the owner or otherwise controls the electronic document. If access permission is granted to the user, then the server can proceed according to one or more of the examples described above with reference to FIGS. 3A-3F. In some implementations, a control 604 allows the user to log into a different account that the user may have at the server; if the new account has access permission to the electronic document, then the server can proceed according to one or more of the examples described above with reference to FIGS. 3A-3F.

In some implementations, a pragmatic approach to document management can be applied in an effort to improve the safeguarding of information. Hypothetically, in an organization an owner or controller of electronic documents may frequently become inundated with numerous access permission requests like those mentioned above. Moreover, contrary to the organization's document protection policy, it is possible that such a person then chooses to change the document from protected status to being freely accessible, merely because the person is unable to timely resolve all incoming requests for access.

The pragmatic approach mentioned above can be based on recognizing that a person who is able to perceive a tangible instance of a document has, practically speaking, already gained at least minimal access to the document even if they have not (yet) been formally granted access in a corresponding computer system. Referring again briefly to FIG. 3A, the user wearing the AR headset is currently in the presence of the tangible instance 300 and is presumably able to perceive its contents. If the user is only present at the tangible instance 300 for a minor amount of time, then it is possible that they came in contact with the tangible instance 300 unintentionally and did not have reason or opportunity to perceive its contents fully or in depth. In such situations it may not be justified to change the user's status as not having access permission to the corresponding electronic document. However, if the user is found to have been in the presence of (e.g., viewing, using the AR headset) the tangible instance 300 for at least a predetermined time, then it can be deemed that the better course of action is to automatically grant the person access permission to the corresponding electronic document without the person having to formally request it. What is considered an adequate length of time can be defined based on the nature of the information in the document, the size or complexity of the document, the type of organization, or the user's role within the organization. Upon the server determining that the user has accessed (e.g., been in the presence of) the tangible instance 300 for at least the predetermined time, the server can automatically grant the user access to the corresponding electronic document without presenting the prompt 600.

Figure 7B:
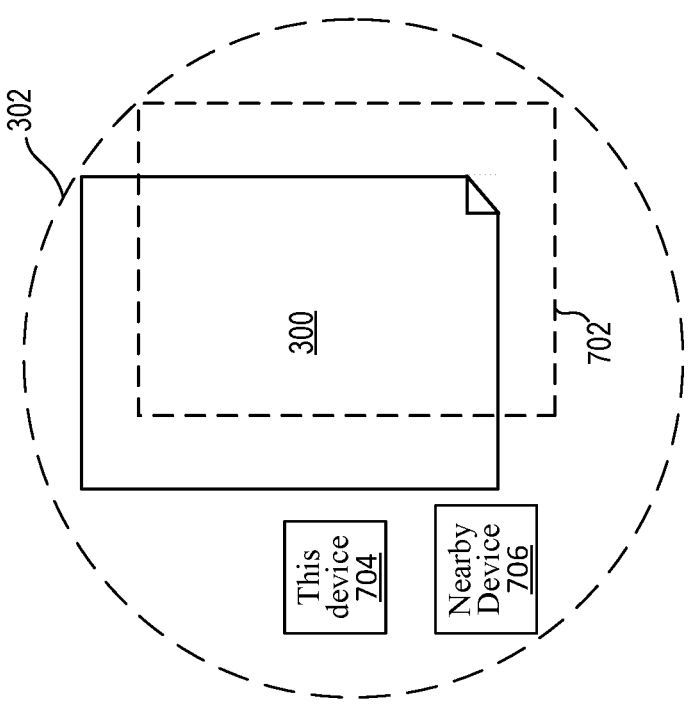
FIGS. 7A-7B show examples relating to the tangible instance of FIGS. 3A-3E and the AR field of view.
Figure 7A:
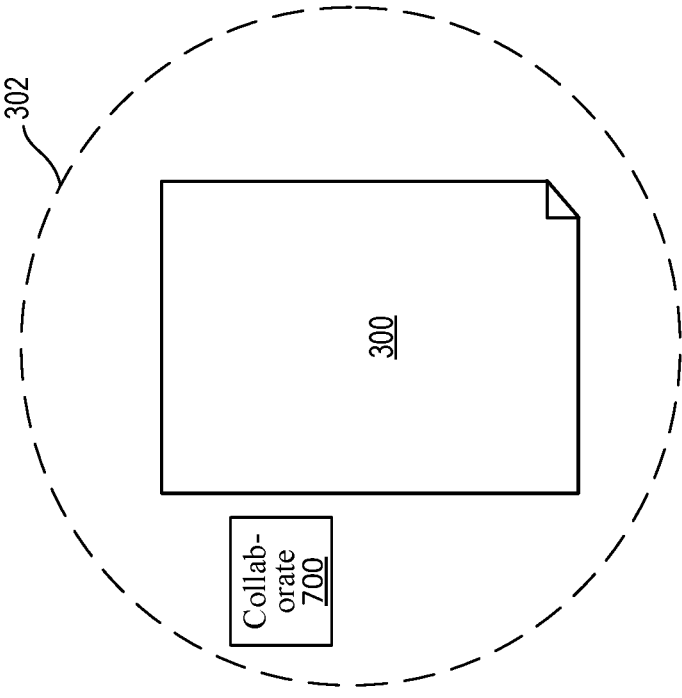

Mappings as described herein can facilitate easier access to a collaboration program for a collection of documents, such as by providing a convenient way of finding and accessing a collaborative document based on perceiving a tangible instance thereof. FIGS. 7A-7B show examples relating to the tangible instance 300 of FIGS. 3A-3E and the AR field of view 302. The examples described with reference to the present illustrations can be used together with one or more other examples described elsewhere herein.

These examples involve the situation where the tangible instance 300 corresponds to a document in a collection of documents associated with a collaboration program. In FIG. 7A, the user wearing the AR headset is currently viewing the tangible instance 300 in the AR field of view 302. Referring again briefly to the situation in FIG. 3B, when the server determines based on the provided hash that the user has access permission to the corresponding electronic document, the server can make one or more additional functionalities available to the user. In some implementations, a control 700 can be provided by the AR headset, such as by being visually included in the AR field of view 302. The user can activate the control 700 to obtain access to the corresponding electronic document.

In some implementations, the function described with reference to FIG. 7A can be triggered by performing a gesture. For example, the user can perform a gesture within the AR field of view 302. The AR headset can interpret this input as a request to "drag" the corresponding electronic document from the tangible instance 300 that is being viewed with the AR headset. The dragging can be spatially controlled by the position and movement of the user's hand or finger. FIG. 7B shows that the user performs a gesture to drag a shape 702 away from the image of the tangible instance 300 within the AR field of view 302. That is, the shape 702 is rendered by the AR headset; the tangible instance 300, on the other hand, is visible within the AR field of view 302 but is not rendered by the AR headset. A control 704 corresponds to the computer system of the AR headset. For example, the user can perform a gesture corresponding to "dropping" the shape 702 at the control 704. This can cause the computer system of the AR headset to create an access to the corresponding electronic document of the collaboration program. The access can be created in form of a representation (e.g., a link or an icon) of the electronic document on a graphical user interface of the computer system controlling the AR headset. When the access has been created, the user can open the corresponding electronic document on the computer system using the collaboration program.

A control 706, moreover, corresponds to a nearby computer system detected by the AR headset. For example, by way of near-field communication the AR headset can determine that the user's tablet or laptop computer is in the vicinity, and this can cause the AR headset to identify the tablet or laptop as another computer system associated with the user. The user can perform a gesture corresponding to "dropping" the shape 702 at the control 706. This can cause an access to the corresponding electronic document of the collaboration program to be created at that other computer system. The access at the other computer system can be created in form of a representation (e.g., a link or an icon) of the electronic document on a graphical user interface. When the access has been created, the user can open the corresponding electronic document on the other computer system using the collaboration program.

Mappings as described herein can also or instead facilitate easier access, outside the realm of AR, to a collaboration program for a collection of documents, such as by providing cross-computer document management. FIGS. 8A-8E show examples relating to the tangible instance 300 of FIGS. 3A-3E and a display device 800. The examples described with reference to the display device 800 can be used with one or more other examples described elsewhere herein.

The display device 800 is controlled by a computer system that currently is presenting a screen sharing application 802. In some implementations, the user of the computer system is currently involved in a videoconference with another person who is using a separate computer system, and that person is sharing content using the screen sharing application 802. For example, the person is sharing an electronic document from that separate computer system, which appears as a tangible instance 804 on the display device 800.

Figure 8A:
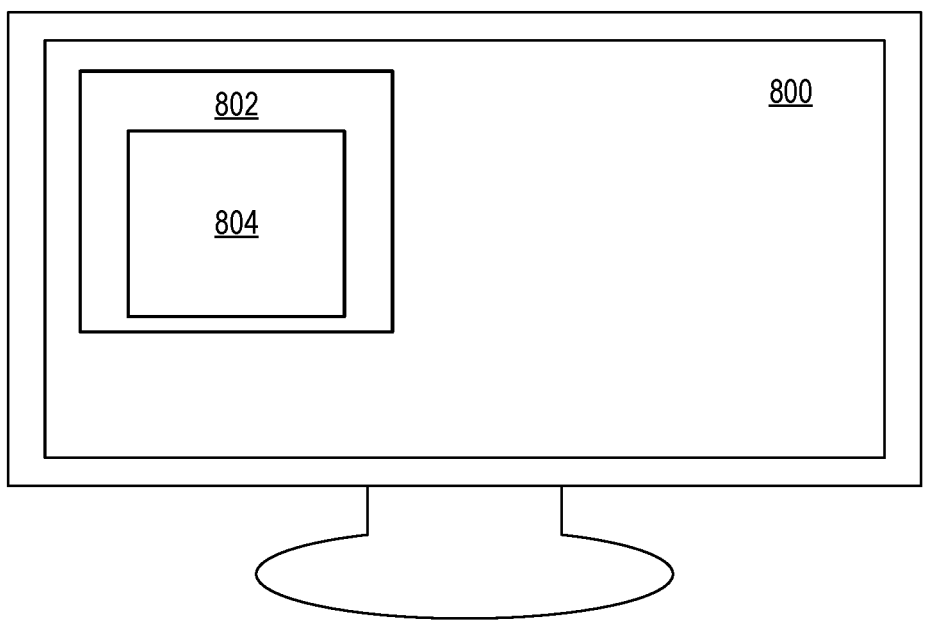
FIGS. 8A-8E show examples relating to the tangible instance of FIGS. 3A-3E and a display device.
Figure 8B:
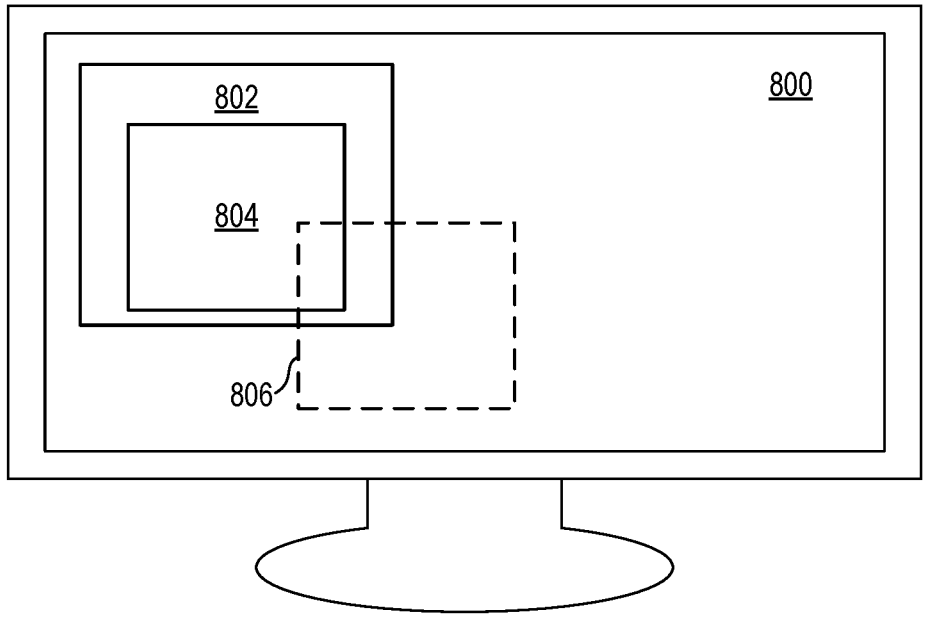
Figure 8C:
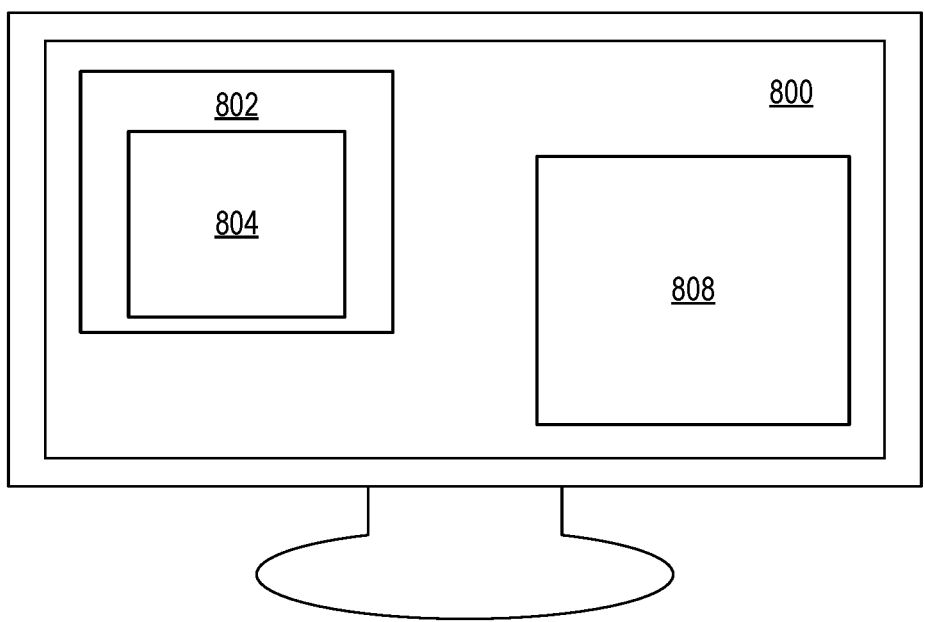

The computer system of the display device 800 can detect the content of the tangible instance 804 based on it being presented on the display device 800. The computer system can provide a hash to a server that controls the collaboration program. In response to the server determining using the provided hash that the user has access permission to the corresponding electronic document, one or more additional functionalities can be made available to the user. FIG. 8B shows that the user drags a shape 806 representing the corresponding electronic document from the tangible instance 804 of the screen sharing application 802 and places the shape 806 on the desktop of the display device 800. This can cause the computer system of the display device 800 to create access to the corresponding electronic document of the collaboration program. FIG. 8C shows a representation 808 of the electronic document being located on the desktop. The representation 808 can comprise a link or an icon that triggers the collaboration program to present the corresponding electronic document on the computer system.

Figure 8D:
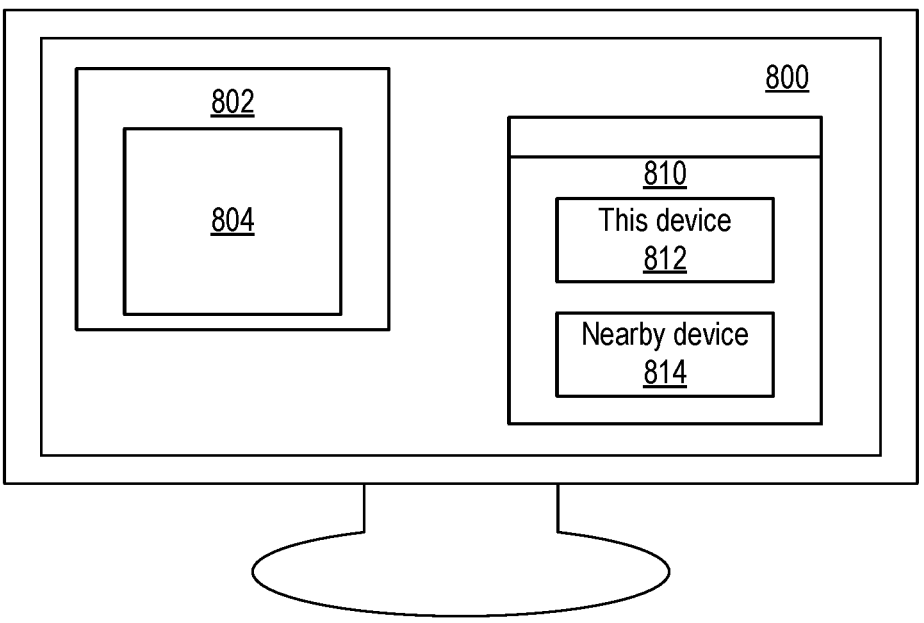

An application executed by the computer program of the display device 800 can also or instead facilitate access to the collaboration program based on the tangible instance 804 being detected. FIG. 8D shows that the computer system of the display device 800 presents a browser 810. The browser 810 can detect the content of the tangible instance 804 and provide one or more functions to the user in response. In some implementations, the browser 810 presents a control 812 for creating, at the computer system of the display device 800, an access to the corresponding electronic document of the collaboration program. This can place the representation 808 (FIG. 8C) on the desktop.

Figure 8E:
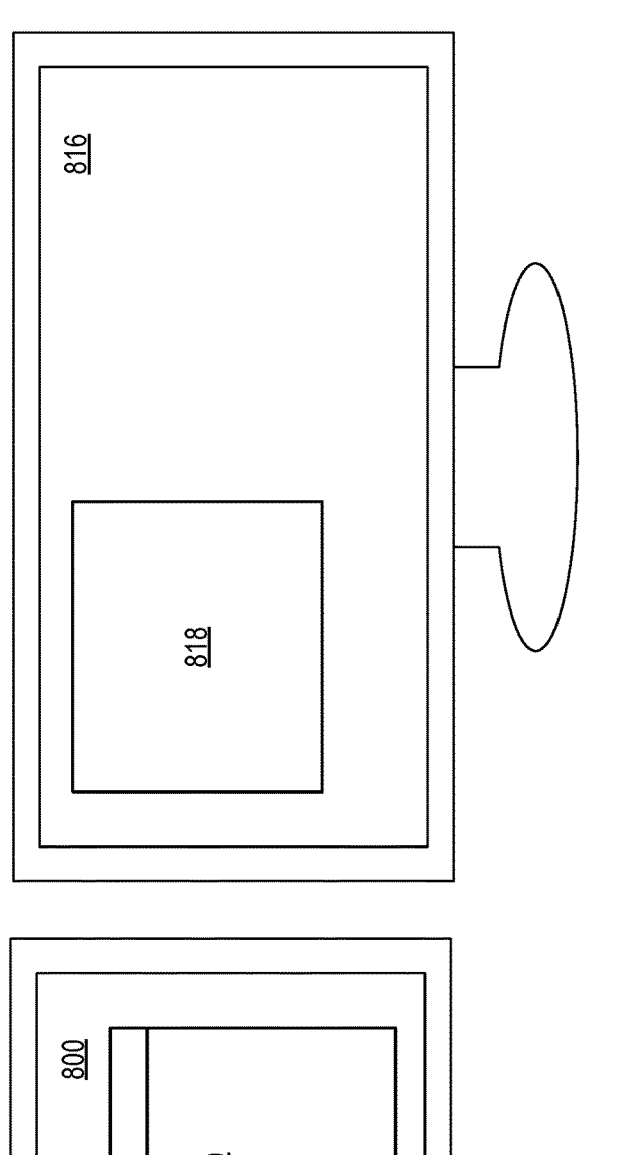

In some implementations, the browser 810 presents a control 814 for creating, at another computer system, an access to the corresponding electronic document of the collaboration program. The other computer system can be a nearby computer system detected by the computer system of the display device 800. For example, by way of near-field communication the computer system of the display device 800 can determine that the user's tablet or laptop computer is in the vicinity, and this can cause the computer system of the display device 800 to identify the tablet or laptop as another computer system associated with the user. Activation of the control 814 can cause an access to the corresponding electronic document of the collaboration program to be created at that other computer system. FIG. 8E shows that the other system has a display device 816, and that a representation 818 of the electronic document is located on a desktop thereof. The representation 818 can comprise a link or an icon that triggers the collaboration program to present the corresponding electronic document on the other computer system.

Figure 9A:
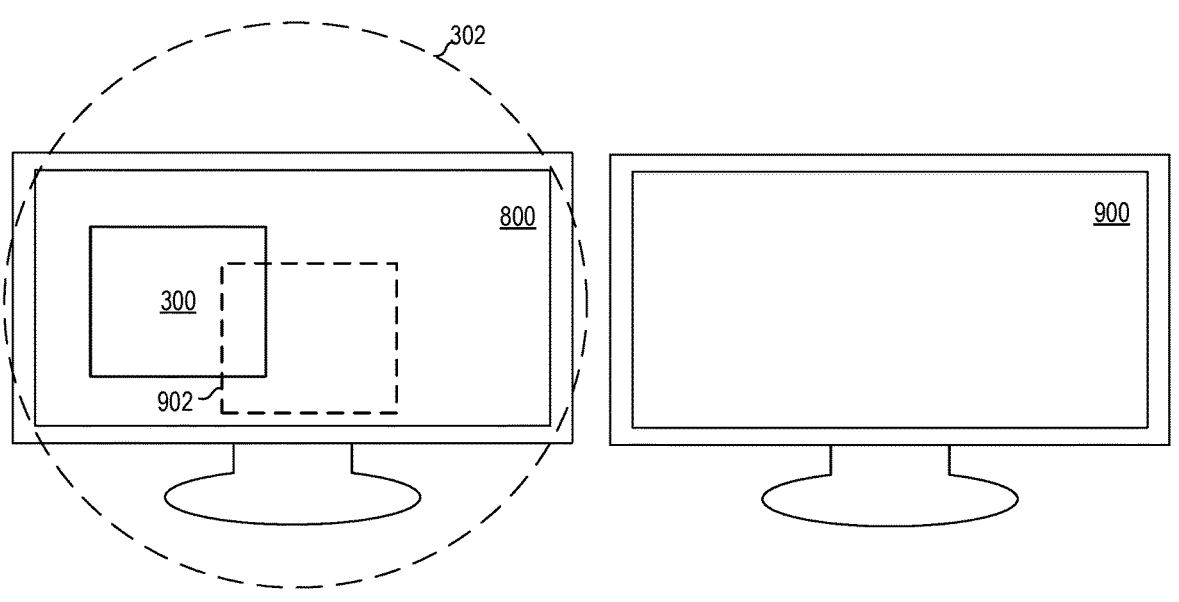
FIGS. 9A-9B show examples relating to the display device of FIGS. 8A-8E.
Figure 9B:
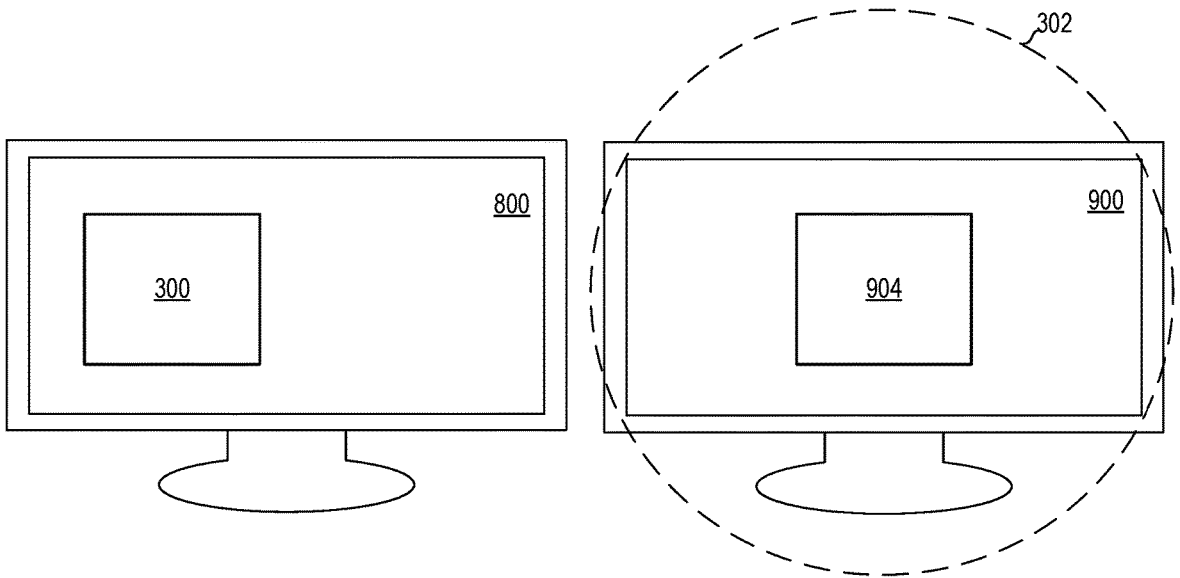

As mentioned earlier, mappings as described herein can facilitate easier access to a collaboration program for a collection of documents, such as by providing cross-computer document management. FIGS. 9A-9B show examples relating to the display device 800 of FIGS. 8A-8E. The display device 800 may be controlled by a computer system running a particular operating system, and another display device 900 may be controlled by a separate computer system running a different operating system. Operating systems may be, for example, Chrome OS or Android designed by Google, Windows designed by Microsoft, macOS or iOS designed by Apple, or an open-source operating system (e.g., Linux).

Here, the tangible instance 300 is presented by the display device 800 and is currently within the AR field of view 302. FIG. 9A shows that the user drags a shape 902 away from the image of the tangible instance 300 within the AR field of view 302. For example, the user drags the shape 902 by way of performing a gesture within the AR field of view 302, the gesture detected and interpreted by the AR headset. That is, the shape 902 is rendered by the AR headset; the tangible instance 300, on the other hand, is visible within the AR field of view 302 but is rendered by the display device 800.

With the shape 902 rendered within the AR field of view 302 by the AR headset, the user can instead gaze at the display device 900, as indicated in FIG. 9B. For example, the user may turn his or her head so that the AR field of view 302 is instead directed at the display device 900. As another example, the AR field of view 302 can be large enough to accommodate both the display devices 800 and 900. The AR headset is connected to each of the respective computer systems of the display devices 800 and 900. For example, a near-field communication network can couple the AR headset and the computer systems to each other. The user can "drop" the shape 902 at the display device 900 by performing a gesture in front of its desktop. Based on the AR headset knowing the identity, location, and network address of the computer system for the display device 900, the AR headset can cause a representation 904 of the electronic document to be located on a desktop of the display device 900. The representation 904 can comprise a link or an icon that triggers the collaboration program to present the corresponding electronic document on the display device 900.

Figure 10:
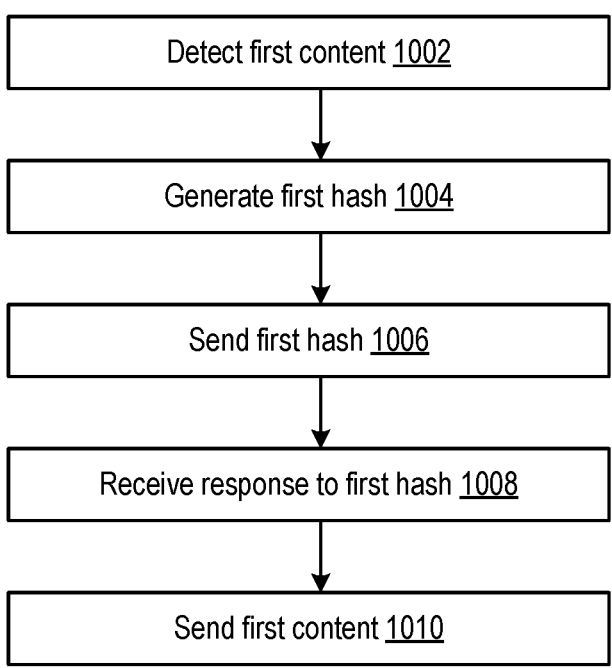
FIG. 10 shows an example of a computer-implemented method.

FIG. 10 shows an example of a computer-implemented method 1000. The computer-implemented method 1000 can be used with one or more examples described elsewhere herein. Unless otherwise indicated, more or fewer operations than shown can be performed, and/or two or more operations can be performed in a different order.

The computer-implemented method 1000 can include an operation 1002 of detecting, by a first computer system, first content of a tangible instance of a first document. For example, an instance of the computer system 100 (FIG. 1) acting at a client side can detect content of the tangible instance 300 (FIG. 3).

The computer-implemented method 1000 can include an operation 1004 of generating, by the first computer system, a first hash using the first content, the first hash including first obfuscation content. For example, an instance of the computer system 100 (FIG. 1) acting at a client side can generate a hash of the content of the tangible instance 300 (FIG. 3).

The computer-implemented method 1000 can include an operation 1006 of sending, by the first computer system, the first hash for receipt by a second computer system. For example, an instance of the computer system 100 (FIG. 1) acting at a client side can send the hash of the content of the tangible instance 300 (FIG. 3) for receipt by an instance of the computer system 100 (FIG. 1) acting at a server side.

The computer-implemented method 1000 can include an operation 1008 of receiving, by the first computer system, a response to the first hash generated by the second computer system, the response including information corresponding to a second document associated with the first content. For example, an instance of the computer system 100 (FIG. 1) acting at a client side can receive a response generated by an instance of the computer system 100 (FIG. 1) acting at a server side.

The computer-implemented method 1000 can include an operation 1010 of sending, by the first computer system and based on the response, the first content for receipt by the second computer system. For example, an instance of the computer system 100 (FIG. 1) acting at a client side can send the content of the tangible instance 300 (FIG. 3) for receipt by an instance of the computer system 100 (FIG. 1) acting at a server side.

Figure 11:
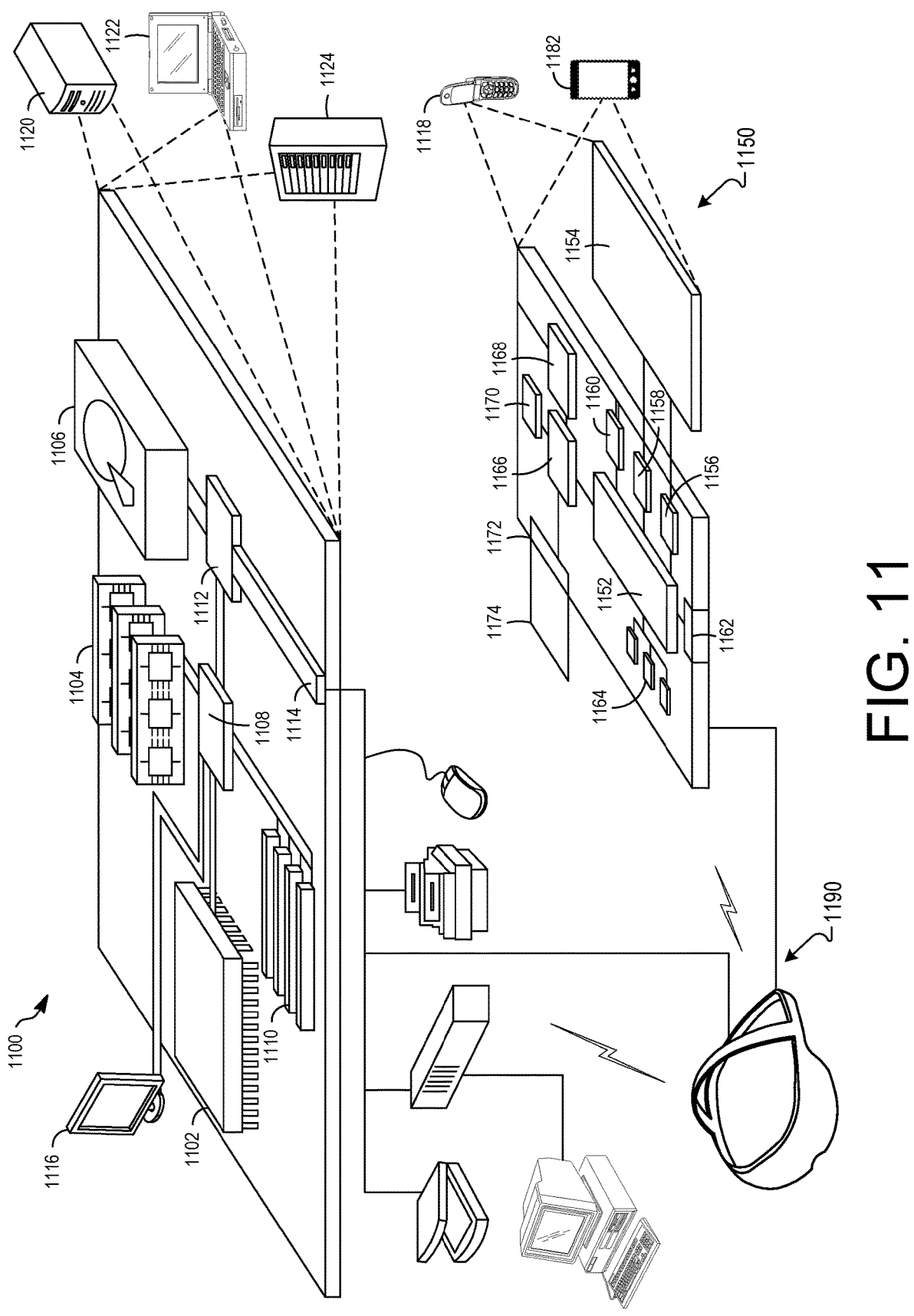
FIG. 11 shows an example of a computer device and a mobile computer device that can be used to implement the techniques described here.

FIG. 11 shows an example of a computer device and a mobile computer device that can be used to implement the techniques described here. FIG. 11 shows an example of a generic computer device 1100 and a generic mobile computer device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes at least one processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes at least one processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150 or may also store applications or other information for device 1150. Specifically, expansion memory 1174 may include instructions to carry out or supplement the processes described above and may include secure information also. Thus, for example, expansion memory 1174 may be provide as a security module for device 1150 and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1118. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 11 can include sensors that interface with a virtual reality (VR headset 1190). For example, one or more sensors included on a computing device 1150 or other computing device depicted in FIG. 11, can provide input to VR headset 1190 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1150 can use the sensors to determine an absolute position and/or a detected rotation of the computing device in the VR space that can then be used as input to the VR space. For example, the computing device 1150 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1150 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1150 when the computing device is incorporated into the VR space can cause a particular action to occur in the VR space.

In some implementations, a touchscreen of the computing device 1150 can be rendered as a touchpad in VR space. A user can interact with the touchscreen of the computing device 1150. The interactions are rendered, in VR headset 1190 for example, as movements on the rendered touchpad in the VR space. The rendered movements can control objects in the VR space.

In some implementations, one or more output devices included on the computing device 1150 can provide output and/or feedback to a user of the VR headset 1190 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1150 may appear as another object in a computer-generated, 3D environment. Interactions by the user with the computing device 1150 (e.g., rotating, shaking, touching a touchscreen, swiping a finger across a touch screen) can be interpreted as interactions with the object in the VR space. In the example of the laser pointer in a VR space, the computing device 1150 appears as a virtual laser pointer in the computer-generated, 3D environment. As the user manipulates the computing device 1150, the user in the VR space sees movement of the laser pointer. The user receives feedback from interactions with the computing device 1150 in the VR space on the computing device 1150 or on the VR headset 1190.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
capturing, by an image sensor of a first computer system, first content of a hardcopy instance or an on-screen presentation instance of a first document;
generating, by the first computer system, a first hash using the first content, the first hash incorporating content not originating from the first document;
sending, by the first computer system, the first hash for a look up against a collection of documents associated with a collaboration program; and
receiving, by the first computer system, a response to the first hash, the response including information corresponding to a second document associated with the first content, the second document being included in the collection of documents.

2. The computer-implemented method of claim 1, wherein the first hash is sent to a second computer system and the second computer system controls the collaboration program for the collection of documents.

3. The computer-implemented method of claim 2, further comprising sending, by the first computer system and based on the response, the first content for receipt by the second computer system.

4. The computer-implemented method of claim 3, wherein the second computer system generates a new document for the collaboration program using the first content.

5. The computer-implemented method of claim 2, further comprising sending, by the first computer system and based on the response, a marked-up change of the first document for receipt by the second computer system.

6. The computer-implemented method of claim 2, wherein the second computer system generates a second hash using second contents of the second document, the second hash incorporating content not originating from the second document, and wherein the second hash is included in the response.

7. The computer-implemented method of claim 6, further comprising verifying, by the first computer system and using the second hash, a correspondence between the first document and the second document.

8. The computer-implemented method of claim 7, further comprising receiving, by the first computer system, the second document from the second computer system.

9. The computer-implemented method of claim 6, wherein the second computer system performs detection of unauthorized access of the second contents upon receiving the first hash.

10. The computer-implemented method of claim 2, further comprising receiving, by the first computer system, a history of access for a user of the first computer system, the history including an entry for accessing the second document based on the second computer system having received the first hash.

11. The computer-implemented method of claim 10, wherein the entry for accessing the second document is based on detecting that the user is proximate to at least one of the hardcopy instance of the first document or the on-screen presentation instance of the first document.

12. The computer-implemented method of claim 10, wherein the second computer system generates the entry in response to determining that the user has access permission to the second document.

13. The computer-implemented method of claim 10, wherein the user does not have access permission to the second document, and wherein the information corresponding to the second document includes a control for the user to request access permission to the second document.

14. The computer-implemented method of claim 10, wherein the user does not have access permission to the second document, and wherein the second computer system grants the access permission to the user in response to determining that the user is accessing the first document for at least a predetermined time.

15. The computer-implemented method of claim 2, wherein the first computer system identifies a user of the first computer system to the second computer system, and wherein the collection of documents is defined based on the user having access permission to the collection of documents.

16. The computer-implemented method of claim 2, further comprising receiving, by the first computer system and from a user, a request for text-to-speech service of the first document, wherein the second document contains structure markup, and providing the text-to-speech service of the first document using the second document.

17. The computer-implemented method of claim 2, wherein the first computer system detects the first content based on the first document being presented on a display device.

18. The computer-implemented method of claim 17, wherein the display device is controlled by the first computer system and presents a screen sharing application on a desktop, wherein the first document is being screen shared with the first computer system using the screen sharing application.

19. The computer-implemented method of claim 18, wherein the first computer system further presents a browser on the desktop, and wherein the browser provides a control for opening the second document on the desktop using the collaboration program.

20. The computer-implemented method of claim 18, further comprising facilitating, by the first computer system, dragging of a representation of the first document to trigger opening of the second document using the collaboration program.

21. The computer-implemented method of claim 20, wherein the dragging causes the second document to be presented on the desktop of the first computer system.

22. The computer-implemented method of claim 20, wherein the dragging causes the second document to be presented on another computer system based on the other computer system being detected by the first computer system.

23. The computer-implemented method of claim 2, wherein the first document and the second document are paper documents, and wherein the second computer system detects the second document being associated with the first document using the first hash and a second hash of the second document.

24. The computer-implemented method of claim 23, wherein the first hash and the second hash facilitate sharing of virtual annotations regarding the first document and the second document between the first computer system and the second computer system.

25. The computer-implemented method of claim 1, wherein the first computer system comprises an augmented-reality (AR) headset, and wherein the first computer system detects the first content based on the first content being within a field of view of the AR headset.

26. The computer-implemented method of claim 25, further comprising detecting, by the first computer system, that a user of the AR headset performs a gesture within the field of view, and in response moving a representation of the first document within the field of view according to the gesture.

27. The computer-implemented method of claim 26, wherein moving of the representation facilitates opening of the second document on the first computer system using the collaboration program.

28. The computer-implemented method of claim 26, wherein moving of the representation facilitates opening of the second document, using a collaboration program, on another computer system detected by the first computer system.

29. The computer-implemented method of claim 1, further comprising presenting, by the first computer system and using the information, second contents of the second document.

30. The computer-implemented method of claim 29, wherein the first computer system comprises an augmented-reality (AR) headset, wherein the first computer system detects the first content based on the first content being within a field of view of the AR headset, and wherein presenting the second contents comprises applying a first virtual annotation to the first document.

31. The computer-implemented method of claim 30, further comprising receiving, by the first computer system, an audio input generated by a user corresponding to making a change in the first document, presenting in the field of view a second virtual annotation to the first document, and sending the change to a second computer system.

32. The computer-implemented method of claim 1, wherein the second document is publicly accessible and wherein the response includes the second document.

33. A computer program product tangibly embodied in a non-transitory storage medium, the computer program product including instructions that when executed by one or more processor(s) cause the one or more processor(s) to perform operations, the operations comprising:

capturing, by an image sensor of a computer system, first content of a hardcopy instance or an on-screen presentation instance of a first document;

generating, by the computer system, a first hash using the first content, the first hash incorporating content not originating from the first document;

sending, by the computer system, the first hash for a look up against a collection of documents associated with a collaboration program; and receiving, by the computer system, a response to the first hash, the response including information corresponding to a second document associated with the first content, the second document being included in the collection of documents.

34. The computer program product of claim 33, wherein the computer system is a first computer system and a second computer system controls the collaboration program for the collection of documents.

35. A computer system comprising:

at least a processor; and a memory storing instructions that, when executed by the processor, cause the computer system to perform operations comprising:

capturing, by an image sensor of the first computer system, first content of a hardcopy instance or an on-screen presentation instance of a first document;

generating, by the computer system, a first hash using the first content, the first hash incorporating content not originating from the first document;

sending, by the computer system, the first hash for a look up against a collection of documents associated with a collaboration program; and receiving, by the computer system, a response to the first hash, the response including information corresponding to a second document associated with the first content, the second document being included in the collection of documents.

36. The computer system of claim 35, wherein the computer system is a first computer system and a second computer system controls the collaboration program for the collection of documents.

\* \* \* \* \*